(12) United States Patent
Hagihara

(10) Patent No.: US 11,815,797 B2
(45) Date of Patent: Nov. 14, 2023

(54) LIGHT SOURCE DEVICE AND PROJECTOR

(71) Applicant: SEIKO EPSON CORPORATION, Tokyo (JP)

(72) Inventor: Takehiko Hagihara, Azumino (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

(21) Appl. No.: 17/983,824

(22) Filed: Nov. 9, 2022

(65) Prior Publication Data

US 2023/0147140 A1     May 11, 2023

(30) Foreign Application Priority Data

Nov. 11, 2021    (JP) .................................. 2021-184054

(51) Int. Cl.
*G03B 21/20*     (2006.01)
*G02B 26/00*     (2006.01)

(52) U.S. Cl.
CPC ......... *G03B 21/204* (2013.01); *G02B 26/008* (2013.01); *G03B 21/208* (2013.01)

(58) Field of Classification Search
CPC ... G03B 21/204; G03B 21/208; G02B 26/008
See application file for complete search history.

(56) References Cited

U.S. PATENT DOCUMENTS

| | | | |
|---|---|---|---|
| 2013/0250255 A1 | 9/2013 | Kurosaki et al. | |
| 2015/0098065 A1* | 4/2015 | Tanaka ............... | G03B 21/2013 353/84 |
| 2016/0077326 A1 | 3/2016 | Yamagishi et al. | |
| 2016/0241820 A1* | 8/2016 | Umamine ............ | G02B 26/008 |
| 2017/0248837 A1* | 8/2017 | Sato ..................... | G02B 26/008 |
| 2017/0269462 A1* | 9/2017 | Maeda .................... | G02B 5/26 |
| 2018/0259839 A1* | 9/2018 | Okuda .................. | G03B 33/08 |
| 2020/0064620 A1* | 2/2020 | Chen .................... | G03B 21/204 |
| 2020/0133108 A1 | 4/2020 | Noda | |

FOREIGN PATENT DOCUMENTS

| | | |
|---|---|---|
| JP | 2013-195846 A | 9/2013 |
| JP | 2016-066061 A | 4/2016 |
| JP | 2020-071379 A | 5/2020 |

\* cited by examiner

*Primary Examiner* — William N Harris
(74) *Attorney, Agent, or Firm* — Dority & Manning, P.A.

(57) ABSTRACT

A light source device according to an aspect of the present disclosure includes a light source unit including a base member on which mounting substrates on which first and second light emitting elements are mounted are placed, a wavelength conversion unit including a wavelength conversion wheel configured to emit wavelength-converted light and a wheel housing configured to house the wavelength conversion wheel, and an optical unit including a condensing optical system configured to condense light emitted from the first and second light emitting elements on the wavelength conversion wheel, a pickup optical system configured to pick up the wavelength-converted light, and an optical housing. The condensing optical system includes a first lens on which the light emitted from the first light emitting element is directly made incident and an optical-path changing member configured to make the light emitted from the second light emitting element incident on the first lens.

8 Claims, 15 Drawing Sheets

LIGHT SOURCE DEVICE AND PROJECTOR

The present application is based on, and claims priority from JP Application Serial Number 2021-184054, filed Nov. 11, 2021, the disclosure of which is hereby incorporated by reference herein in its entirety.

BACKGROUND

1. Technical Field

The present disclosure relates to a light source device and a projector.

2. Related Art

As a light source device used in a projector, there is a technique for generating bright illumination light by making excitation light emitted from a plurality of light emitting elements incident on a fluorescent unit and increasing a light emission amount of fluorescent light (see, for example, JP-A-2016-66061).

In recent years, a further reduction in the size of a projector has been requested. A further reduction in size has also been desired for a light source device used in the projector. However, in the light source device, since brightness of illumination light is regarded as important and the number of light emitting elements is increased, the light source device tends to be increased in size as the outer diameter of a condensing lens for condensing excitation light on a phosphor unit increases.

SUMMARY

According to a first aspect of the present disclosure, there is provided a light source device including: a light source unit including: a first mounting substrate on which a first light emitting element is mounted; a second mounting substrate that is disposed in parallel to the first mounting substrate and on which a second light emitting element is mounted; and a base member on which the first mounting substrate and the second mounting substrate are placed; a wavelength conversion unit including: a wavelength conversion wheel configured to emit, from a second surface opposite to a first surface, wavelength-converted light obtained by wavelength-converting light emitted from the first light emitting element and the second light emitting element and made incident from the first surface; and a wheel housing configured to house the wavelength conversion wheel; and an optical unit including: a condensing optical system configured to condense the light emitted from the first light emitting element and the second light emitting element on the wavelength conversion wheel; a pickup optical system configured to pick up the wavelength-converted light; and an optical housing configured to hold the condensing optical system and the pickup optical system to locate the wavelength conversion wheel on an optical path between the condensing optical system and the pickup optical system. The condensing optical system includes: a first lens on which the light emitted from the first light emitting element is directly made incident; and an optical-path changing member including a first reflection surface and a second reflection surface and configured to reflect, with the first reflection surface, the light emitted from the second light emitting element in a direction in which the light is brought closer to the light emitted from the first light emitting element and reflect, with the second reflection surface, the light reflected by the first reflection surface and make the light incident on the first lens. The optical housing includes: a first supporting section formed to recess to the wavelength conversion wheel side with respect to a holding surface for holding the light source unit and configured to support the optical-path changing member; and a second supporting section formed to recess to the wavelength conversion wheel side with respect to a bottom surface of the first supporting section and configured to support the first lens. The holding surface of the optical housing and the base member are fixed.

According to a second aspect of the present disclosure, there is provided a projector including: the light source device according to the first aspect; an image forming device configured to form light output from the light source device into image light; and a projection optical device configured to project the image light output from the image forming device.

DESCRIPTION OF EXEMPLARY EMBODIMENTS

Figure 1:
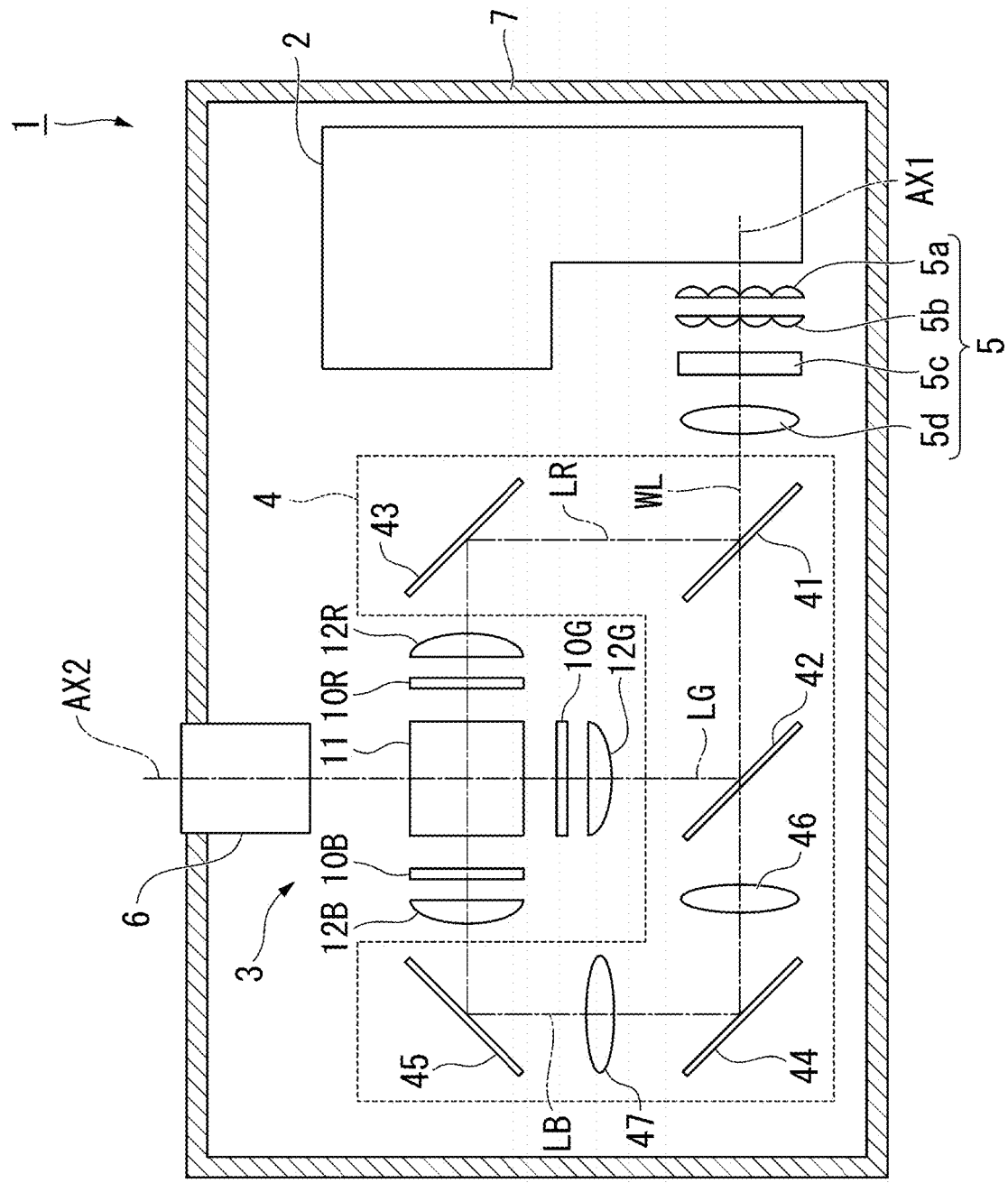
FIG. 1 is a diagram showing an overall configuration of a projector in a first embodiment.

Embodiments of the present disclosure are explained in detail below with reference to the drawings.

In the drawings referred to in the following explanation, characteristic portions are sometimes enlarged and shown for convenience in order to clearly show characteristics. Dimension ratios and the like of components are not always the same as actual dimension ratios and the like.

First Embodiment

FIG. 1 is a diagram showing an overall configuration of a projector in a first embodiment.

A projector 1 in this embodiment modulates illumination light emitted from a light source device 2 to generate image light corresponding to image information and enlarges and projects the formed image light onto a projection surface such as a screen.

As shown in FIG. 1, the projector 1 includes a light source device 2, an image forming device 3, a projection optical device 6, and an exterior housing 7.

The light source device 2 supplies white illumination light WL to the image forming device 3. The light source device 2 in this embodiment generates the illumination light WL including fluorescent light generated by wavelength-converting, with a phosphor, excitation light emitted from a light source module including a semiconductor laser. The configuration of the light source device 2 is explained below.

The image forming device 3 includes light modulation panels 10R, 10G, and 10B and a cross dichroic prism 11. Each of the light modulation panels 10R, 10G, and 10B modulates color light made incident thereon according to image information to form image light. Each of the light modulation panels 10R, 10G, and 10B is configured by a light transmissive liquid crystal panel.

The cross dichroic prism 11 combines image lights emitted from the light modulation panels 10R, 10G, and 10B. The cross dichroic prism 11 is formed in a substantially square shape in a plane view obtained by pasting together four right-angle prisms. A dielectric multilayer film is provided on a substantially X-shaped interface where the right-angle prisms are pasted together.

Based on such a configuration, the image forming device 3 in this embodiment combines the image lights of the colors to generate full-color image light.

In this embodiment, field lenses 12R, 12G, and 12B are provided on light incident sides of the respective light modulation panels 10R, 10G, and 10B.

Although not illustrated, incident side polarization plates are disposed between the light modulation panels 10R, 10G, and 10B and the field lenses 12R, 12G, and 12B and emission side polarization plates are disposed between the light modulation panels 10R, 10G, and 10B and the cross dichroic prism 11.

In this embodiment, the image forming device 3 further includes a color separation optical system 4 and a uniform illumination optical system 5.

The illumination light WL emitted from the light source device 2 is made incident on the uniform illumination optical system 5.

The uniform illumination optical system 5 includes a first lens array 5a, a second lens array 5b, a polarization conversion element 5c, and a superimposition lens 5d.

The first lens array 5a includes a plurality of first small lenses for dividing the illumination light WL made incident from the light source device 2 into a plurality of partial light beams. The plurality of first small lenses are arrayed in a matrix shape in a plane orthogonal to an optical axis AX1 of the illumination light WL.

The second lens array 5b includes a plurality of second small lenses corresponding to the plurality of first small lenses of the first lens array 5a. The plurality of second small lenses are arrayed in a matrix shape in a plane orthogonal to the optical axis AX1.

The second lens array 5b forms, in conjunction with the superimposition lens 5d, images of the first small lenses of the first lens array 5a respectively in the vicinities of image forming regions of the light modulation panels 10R, 10G, and 10B.

The polarization conversion element 5c converts light emitted from the second lens array 5b into linearly polarized light in one direction. The polarization conversion element 5c includes, for example, a polarization separation film and a phase difference plate not shown in FIG. 1.

The superimposition lens 5d condenses the partial light beams emitted from the polarization conversion element 5c and superimposes the partial light beams respectively in the vicinities of the image forming regions of the light modulation panels 10R, 10G, and 10B.

The color separation optical system 4 separates the illumination light WL passed through the uniform illumination optical system 5 into red light LR, green light LG, and blue light LB and guides the red light LR, the green light LG, and the blue light LB to the light modulation panels 10R, 10G, and 10B. The color separation optical system 4 includes a first dichroic mirror 41, a second dichroic mirror 42, a first reflection mirror 43, a second reflection mirror 44, a third reflection mirror 45, a first relay lens 46, and a second relay lens 47.

The first dichroic mirror 41 reflects the red light LR and transmits the green light LG and the blue light LB. Of the green light LG and the blue light LB transmitted through the first dichroic mirror 41, the second dichroic mirror 42 reflects the green light LG and transmits the blue light LB. The first reflection mirror 43 reflects the red light LR. The second reflection mirror 44 and the third reflection mirror 45 reflect the blue light LB. The first relay lens 46 is disposed between the second dichroic mirror 42 and the second reflection mirror 44. The second relay lens 47 is disposed between the second reflection mirror 44 and the third reflection mirror 45.

The projection optical device 6 includes a projection lens group. Image light combined by the cross dichroic prism 11 of the image forming device 3 is made incident on the projection optical device 6. Although not illustrated, a lens shift mechanism for shifting an optical axis AX2 of the projection optical device 6 may be provided in a connecting portion of the projection optical device 6 and the cross dichroic prism 11 of the image forming device 3.

Based on such a configuration, the projector 1 in this embodiment can enlarge and project the image light generated by the image forming device 3 toward a projection surface such as a screen. Consequently, an enlarged color video is displayed on the screen.

The exterior housing 7 houses the light source device 2 and the image forming device 3 on the inside and configures the exterior of the projector 1.

Light Source Device

Subsequently, the configuration of the light source device 2 is explained.

Figure 2:
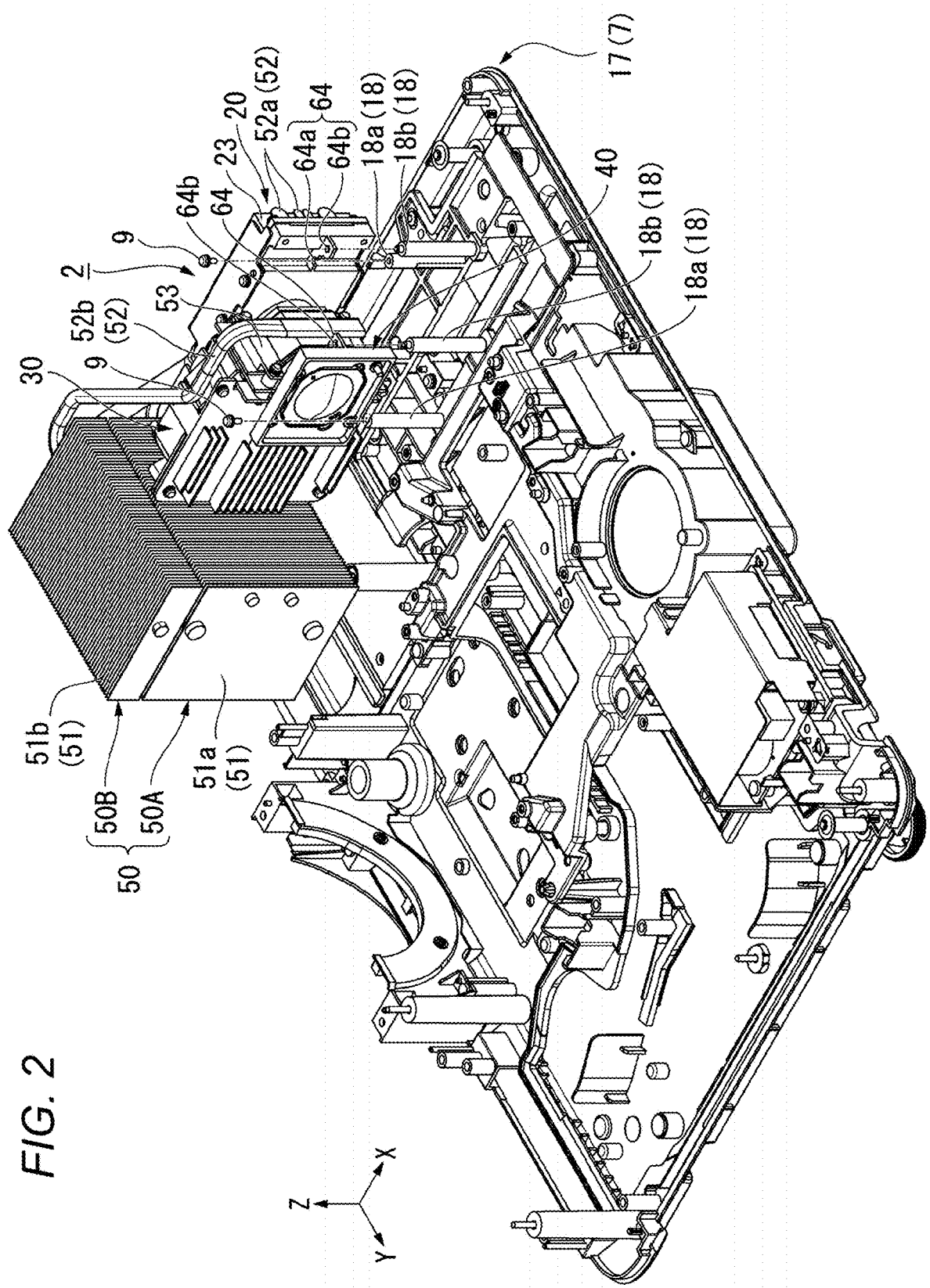
FIG. 2 is an exploded perspective view showing an attachment state of a light source device.

FIG. 2 is an exploded perspective view showing an attachment state of the light source device 2 to the exterior housing 7. In FIG. 2, a bottom plate section 17, which is a part of the exterior housing 7, is shown in order to show the internal structure of the projector 1.

In the following explanation concerning the light source device, an XYZ orthogonal coordinate system is used according to necessity.

In the drawings, a Y axis is an axis along the optical axis AX1 of the illumination light WL emitted from the light source device 2 toward the image forming device 3 shown in FIG. 1. A Z axis is an axis orthogonal to the Y axis and orthogonal to a plate surface of the bottom plate section 17 of the exterior housing 7. An X axis is an axis orthogonal to the Y axis and the Z axis.

In the following explanation in this embodiment, for example, a direction along the Z axis is referred to as "up-down direction Z" in the light source device 2, +Z is referred to as "upper side", −Z is referred to as "lower side", a direction along the X axis is referred to as "left-right direction X" in the light source device 2, +X that is a rear side opposite to the front of the projector 1 in which the projection optical device 6 is provided is referred to as "right side", −X that is the front side of the projector 1 is referred to as "left side", a direction along the Y axis is referred to as "front-rear direction Y" in the light source device 2, +Y is referred to as "front side", and −Y is referred to as "rear side".

The up-down direction Z, the left-right direction X, and the front-rear direction Y are simply names for explaining a disposition relation among constituent members of the light source device 2 and do not define actual setting postures and directions in the light source device 2 and the projector 1.

As shown in FIG. 2, the light source device 2 in this embodiment is held on the bottom plate section 17 of the exterior housing 7 via screw members 9. The bottom plate section 17 includes a light source holding member 18 for holding the light source device 2. The light source holding member 18 includes a plurality of screw fastening sections 18a projecting from the bottom plate section 17 to the upper side +Z and a plurality of positioning sections 18b projecting from the bottom plate section 17 to the upper side +Z. The plurality of screw fastening sections 18a are parts where the screw members 9 are fastened. The plurality of positioning sections 18b are pins for positioning the light source device 2 in a predetermined position with respect to the bottom plate section 17. At least two positioning sections 18b are provided. The numbers and disposition of the screw fastening sections 18a and the positioning sections 18b are not limited to the form shown in FIG. 2 and can be changed as appropriate according to the configuration of the light source device 2.

The light source device 2 in this embodiment includes a light source unit 20, a wavelength conversion unit 30, a cooling unit 50, and an optical unit 40. The cooling unit 50 includes a first cooling section 50A that cools the light source unit 20 and a second cooling section 50B that cools the optical unit 40.

The first cooling section 50A includes a first heat radiating section 51a and a first heat conducting section 52a. The second cooling section 50B includes a second heat radiating section 51b and a second heat conducting section 52b. In this embodiment, the first heat radiating section 51a and the second heat radiating section 51b are collectively referred to as heat radiating section 51 and the first heat conducting section 52a and the second heat conducting section 52b are collectively referred to as heat conducting section 52. That is, the cooling unit 50 includes the heat radiating section 51 disposed in parallel to the optical unit 40 and the heat conducting section 52 that conducts heat received by a base member 23 of the light source unit 20 to the heat radiating section 51.

In this embodiment, the heat radiating section 51 is disposed in parallel to the left side −X of the light source unit 20 when viewed from a position on the +Y side.

The first heat conducting section 52a thermally connects the first heat radiating section 51a and the base member 23 of the light source unit 20. The thermally connecting means a state in which two members are connected to be capable of transferring heat. Another member may be interposed between the two members if the heat transfer is possible between the two members.

The heat received by the base member 23 is conducted to the first heat radiating section 51a via the first heat conducting section 52a. The first heat radiating section 51a is configured by a heat sink including a plurality of heat radiation fins and emits heat conducted from the first heat conducting section 52a. As the first heat conducting section 52a, for example, other than graphite, copper, and the like, a heat pipe, a vapor chamber, and the like that make use of evaporation and condensation of a coolant can also be used. In the case of this embodiment, the first heat conducting section 52a is configured by a heat pipe.

The second heat radiating section 51b is disposed in parallel to the left side −X of the light source unit 20 and the upper side +Z of the first heat radiating section 51a when viewed from a position on the +Y side.

The second heat conducting section 52b thermally connects the second heat radiating section 51b and a lid body 53 provided in the optical unit 40. The lid body 53 is configured by a sheet metal member made of metal excellent in thermal conductivity.

Heat received by the lid body 53 is conducted to the second heat radiating section 51b via the second heat conducting section 52b. The second heat radiating section 51b is configured by a heat sink including a plurality of heat radiation fins and emits heat conducted from the second heat conducting section 52b. As the second heat conducting section 52b, for example, other than graphite, copper, and the like, a heat pipe, a vapor chamber, and the like that make use of evaporation and condensation of a coolant can also be used. In the case of this embodiment, the second heat conducting section 52b is configured by a heat pipe.

Figure 3:
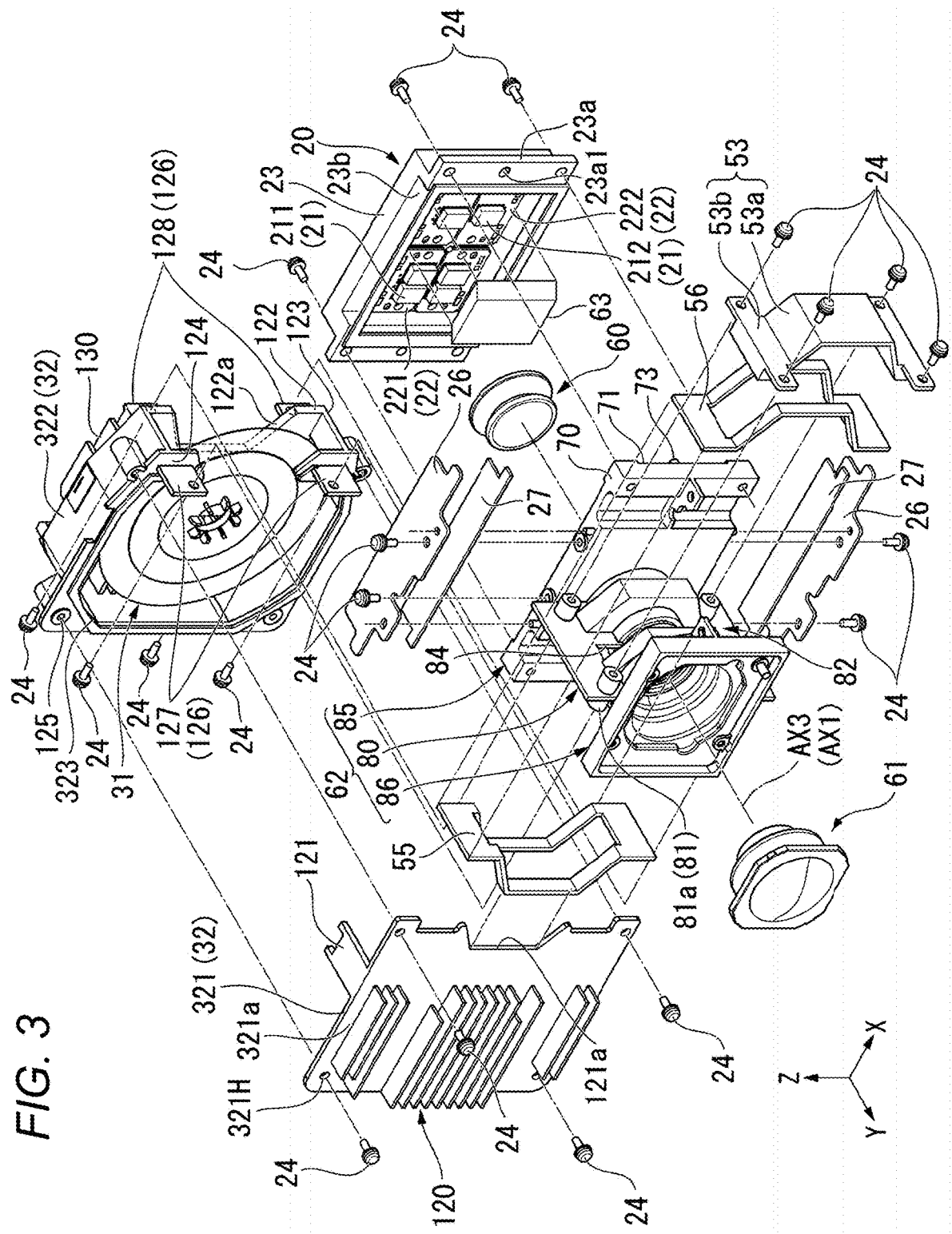
FIG. 3 is an exploded perspective view showing the configuration of the light source device.
Figure 4:
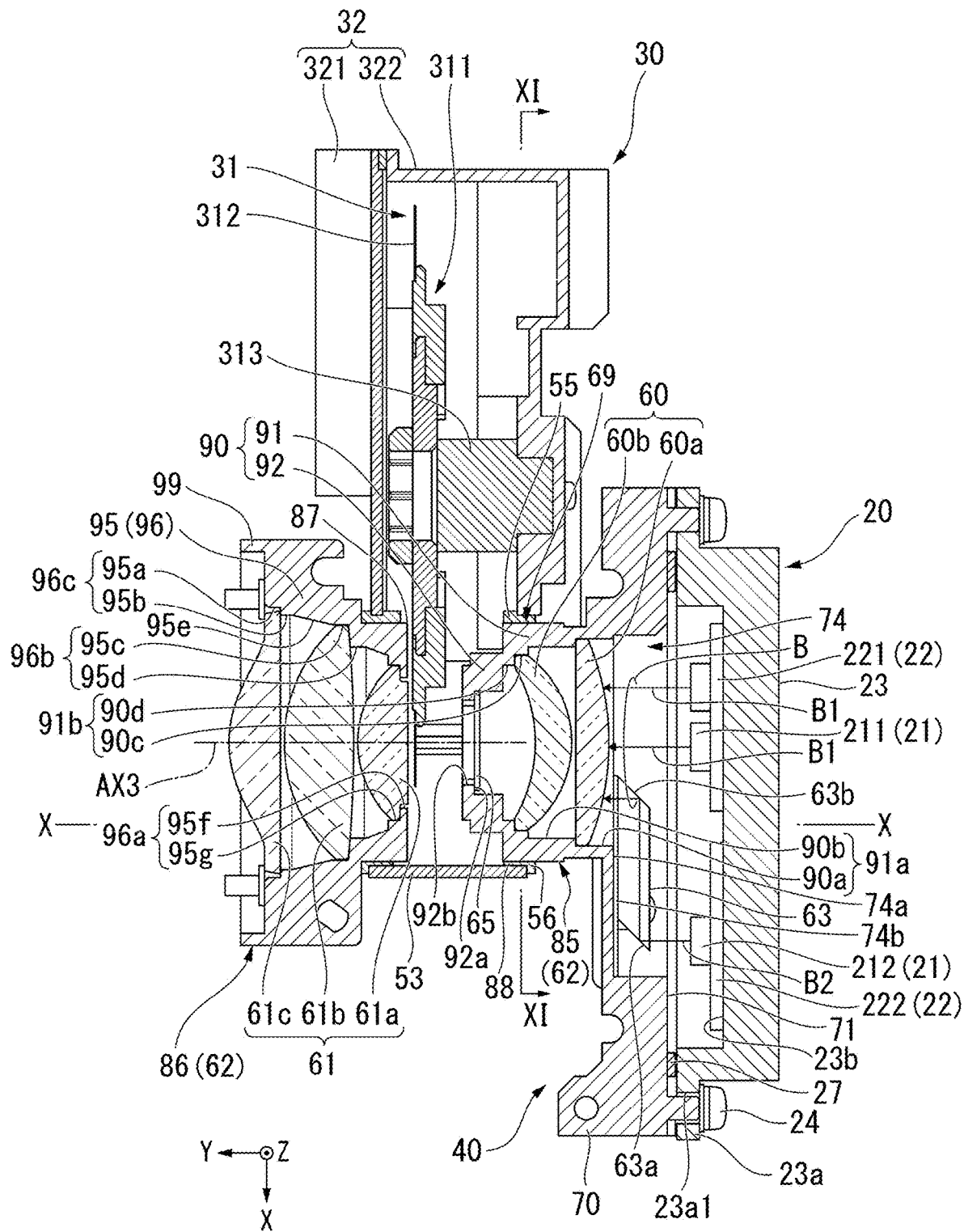
FIG. 4 is a sectional view showing the configuration of the light source device.

FIG. 3 is an exploded perspective view showing the configuration of the light source device 2. FIG. 4 is a sectional view showing the configuration of the light source device 2. FIG. 4 is a sectional view in the left-right direction X on an optical axis AX3 of a condensing optical system 60 explained below.

As shown in FIGS. 3 and 4, the light source device 2 in this embodiment includes the light source unit 20, the optical unit 40, and the wavelength conversion unit 30. In FIGS. 3 and 4, the cooling unit 50 is not shown in order to clearly show the figures.

Light Source Unit

First, the configuration of the light source unit 20 is explained.

As shown in FIGS. 3 and 4, the light source unit 20 includes a plurality of light emitting elements 21, a plurality of mounting substrates 22, and the base member 23. The plurality of light emitting elements 21 include first light emitting elements 211 and second light emitting elements 212. The plurality of mounting substrates 22 include first mounting substrates 221 on which the first light emitting elements 211 are mounted and second mounting substrates 222 on which the second light emitting elements 212 are mounted.

The base member 23 is fixed to the optical unit 40 by screw members 24. The base member 23 includes a fixed section 23a fixed to the light source unit 20 and a recess 23b formed to recess to the rear side −Y from the surface of the fixed section 23a. In the case of this embodiment, the fixed section 23a is disposed to be separated into two in the left-right direction X by the recess 23b.

In the base member 23, the first mounting substrates 221 and the second mounting substrates 222 are placed in the recess 23b. The base member 23 in this embodiment includes the recess 23b to secure a space for mounting the first mounting substrates 221 and the second mounting substrates 222 between the base member 23 and the optical unit 40.

In the case of this embodiment, as shown in FIG. 3, two first mounting substrates 221 and two second mounting substrates 222 are placed on the base member 23. The two first mounting substrates 221 are placed on the base member 23 side by side in the up-down direction Z. The two second mounting substrates 222 are placed on the base member 23 side by side in the up-down direction Z. The first mounting substrates 221 and the second mounting substrates 222 are placed on the base member 23 to be adjacent to each other in the left-right direction X.

On each of the first mounting substrates 221, two first light emitting elements 211 are mounted side by side in the left-right direction X. The number of the first light emitting elements 211 mounted on the first mounting substrate 221 is not limited to this.

As shown in FIG. 4, the first light emitting element 211 includes, for example, a plurality of laser elements and a collimator lens. The first light emitting element 211 emits excitation light B1 formed by blue light having a peak wavelength within a range of, for example, 380 nm to 495 nm.

On each of the second mounting substrates 222, one second light emitting element 212 is mounted. The number of the second light emitting elements 212 mounted on the second mounting substrate 222 is not limited to this.

The second light emitting element 212 has the same configuration as the configuration of the first light emitting element 211. The second light emitting element 212 includes, for example, a plurality of laser elements and a collimator lens. Like the first light emitting element 211, the second light emitting element 212 emits excitation light B2 formed by blue light having a peak wavelength within a range of, for example, 380 nm to 495 nm.

Based on such a configuration, the light source unit 20 emits excitation light B including a plurality of excitation lights B1 and B2 toward the optical unit 40.

As shown in FIG. 3, the recess 23b pierces through the base member 23 in the up-down direction Z. In the light source unit 20 in this embodiment, the end portions in the upper side +Z and the lower side −Z of the recess 23b are respectively closed by a pair of plate materials 26. The plate materials 26 are fixed to, for example, the upper end face and the lower end face of a light-source fixing section 70 via the screw members 24.

In this embodiment, a sheet-like sealing member 27 is provided between the plate materials 26 and the base member 23. In the case of this embodiment, as shown in FIG. 4, a plate-like sealing member 27 is disposed between the base member 23 of the light source unit 20 and a holding surface 71 of the light-source fixing section 70. That is, an optical housing 62 of the light source unit 20 and the base member 23 of the optical unit 40 are fixed in a sealed state. Accordingly, dust is prevented from intruding into the recess 23b of the base member 23 from a gap between the optical housing 62 and the base member 23. Accordingly, a deficiency such as heat generation or the like due to adhesion of dust to the first light emitting elements 211 and the second light emitting elements 212 mounted in the recess 23b is prevented from occurring.

Optical Unit

Subsequently, the configuration of the optical unit 40 is explained.

As shown in FIG. 4, the optical unit 40 includes a condensing optical system 60, a pickup optical system 61, an optical housing 62 that holds the condensing optical system 60 and the pickup optical system 61, a diffusion plate 65, and a lid body 53.

The condensing optical system 60 includes a plurality of lenses. The condensing optical system 60 in this embodiment is configured by two convex lenses including a first lens 60a and a second lens 60b. The number of lenses configuring the condensing optical system 60 is not particularly limited.

The first lens 60a is disposed to be opposed to the light source unit 20. That is, the first lens 60a is a lens located closest to the light incident side in the condensing optical system 60.

The second lens 60b is disposed on the opposite side of the light source unit 20 in the first lens 60a, that is, a light emission side of the first lens 60a.

In the condensing optical system 60 in this embodiment, the diameter of the second lens 60b located on a wavelength conversion wheel 31 side is smaller than the diameter of the first lens 60a located closer to the light incident side than the second lens 60b. That is, the lenses 60a and 60b configuring the condensing optical system 60 have a larger outer diameter in a radial direction orthogonal to the optical axis AX3 of the condensing optical system 60 as the lenses 60a and 60b are further away from the wavelength conversion unit 30. The optical axis AX3 coincides with the optical axis of the first lens 60a and the second lens 60b configuring the condensing optical system 60. As shown in FIG. 3, the optical axis AX3 of the condensing optical system 60 coincides with the optical axis AX1 of the illumination light WL emitted from the light source device 2.

The condensing optical system 60 in this embodiment further includes a prism member 63, which is an optical-path changing member. The prism member 63 is disposed in a position opposed to the second light emitting element 212 and not opposed to the first light emitting element 211 with respect to the light source unit 20.

In the case of this embodiment, the wavelength conversion unit 30 is disposed on the left side −X, which is one side in the left-right direction X, with respect to the optical housing 62 when viewed from a position on the +Y side in the left-right direction X, which is a first direction, crossing the optical axis AX3 of the condensing optical system 60 including the first lens 60a. The prism member 63 is disposed on the right side +X, which is the other side in the left-right direction X, in the optical housing 62.

That is, in the case of this embodiment, the wavelength conversion unit 30 is disposed, with respect to the optical housing 62, on the left side −X opposite to the right side +X where the prism member 63 is provided in the optical housing 62.

In this embodiment, the excitation light B1 emitted from the first light emitting element 211 is directly made incident on the first lens 60a of the condensing optical system 60 as shown in FIG. 4. That is, the excitation light B1 is made incident on the first lens 60a of the condensing optical system 60 without being made incident on the prism member 63. On the other hand, the excitation light B2 emitted from the second light emitting element 212 is made incident on the first lens 60a through the prism member 63.

The prism member 63 is a member that changes an optical path of the excitation light B2 emitted from the second light emitting element 212.

The prism member 63 in this embodiment is configured by a prism member, a plane shape of which is a parallelogram.

The prism member 63 includes a first reflection surface 63a and a second reflection surface 63b separated in the left-right direction X in which the first light emitting element 211 and the second light emitting element 212 are arranged. The first reflection surface 63a is disposed on the optical axis of the excitation light B2 emitted from the second light emitting element 212. The first reflection surface 63a reflects the excitation light B2 emitted from the second light emitting element 212 to the left side −X. That is, the first reflection surface 63a reflects the excitation light B2 emitted from the second light emitting element 212 in a direction in which the excitation light B2 is brought closer to the excitation light B1 emitted from the first light emitting element 211. The excitation light B2 reflected on the first reflection surface 63a is made incident on the second reflection surface 63b.

The second reflection surface 63b reflects, along the optical axis of the first light emitting element 211, the excitation light B2 reflected from the first reflection surface 63a and makes the excitation light B2 incident on the first lens 60a.

The optical path of the excitation light B2 passed through the prism member 63 in this way is shifted to the left side −X compared with before the excitation light B2 passes through the prism member 63. Accordingly, the prism member 63 is capable of reducing a light beam width in the left-right direction X in the excitation light B including the plurality of excitation lights B1 and B2.

The second reflection surface 63b of the prism member 63 is located between the first lens 60a and the first mounting substrate 221 in the front-rear direction Y extending along the optical axis AX3 of the first lens 60a of the condensing optical system 60. That is, the second reflection surface 63b of the prism member 63 is disposed to overlap the first mounting substrate 221 when being viewed in a plane view along the front-rear direction Y. Consequently, the second reflection surface 63b of the prism member 63 is disposed in a position closer to the optical axis of the first lens 60a. Since the second reflection surface 63b does not planarly overlap the first light emitting element 211, the second reflection surface 63b does not block the excitation light B1 made incident on the first lens 60a.

A case is examined in which the second reflection surface 63b is disposed in a position overlapping the second mounting substrate 222 in the front-rear direction Y or a position overlapping a gap between the first mounting substrate 221 and the second mounting substrate 222.

In this case, since the second reflection surface 63b of the prism member 63 is disposed in a position further apart from the optical axis of the first lens 60a, a light beam width of the excitation light B cannot be sufficiently reduced. Accordingly, it is necessary to increase the lens diameter of the first lens 60a because the light beam width of the excitation light B increases. As a result, an increase in the size of the light source device 2 is caused.

In contrast, in the case of this embodiment, as explained above, the second reflection surface 63b of the prism member 63 is disposed in the position closer to the optical axis of the first lens 60a. Therefore, the lens diameter of the first lens 60a on which the excitation light B is made incident decreases. It is possible to achieve a reduction in the size of the light source device 2.

Based on such a configuration, the condensing optical system 60 in this embodiment can condense the excitation light B emitted from the light source unit 20 and make the excitation light B incident on the wavelength conversion wheel 31 of the wavelength conversion unit 30. The configuration of the wavelength conversion unit 30 is explained below.

In the case of this embodiment, the diffusion plate 65 is disposed between the condensing optical system 60 and the wavelength conversion unit 30 on an optical path of the excitation light B. The diffusion plate 65 diffuses the excitation light B and uniformizes a light intensity distribution of the excitation light B on the wavelength conversion wheel 31. As the diffusion plate 65, it is possible to use a publicly-known diffusion plate, for example, ground glass, a holographic diffuser, a diffusion plate obtained by applying blasting to the surface of a transparent substrate, or a diffusion plate obtained by dispersing a scattering material such as beads on the inside of the transparent substrate to scatter light with the scattering material.

The wavelength conversion unit 30 emits fluorescent light YL as wavelength-converted light obtained by wavelength-converting the excitation light B. The fluorescent light YL emitted from the wavelength conversion unit 30 is made incident on the pickup optical system 61.

The pickup optical system 61 picks up wavelength-converted light emitted from the wavelength conversion wheel 31 and converts the wavelength-converted light into parallel light.

The pickup optical system 61 in this embodiment includes a plurality of lenses. The pickup optical system 61 in this embodiment is configured by three convex lenses including a third lens 61a, a fourth lens 61b, and a fifth lens 61c. The number of lenses configuring the pickup optical system 61 is not particularly limited.

The third lens 61a is disposed to be opposed to the wavelength conversion unit 30. That is, the third lens 61a is a lens located closest to the light incident side in the pickup optical system 61.

The fourth lens 61b is disposed on the opposite side of the light source unit 20 in the third lens 61a, that is, a light emission side of the third lens 61a.

The fifth lens 61c is disposed on the opposite side of the light source unit 20 in the fourth lens 61b, that is, the light emission side of the fourth lens 61b.

In the pickup optical system 61 in this embodiment, the diameter of the third lens 61a located on the wavelength conversion wheel 31 side is smaller than the diameter of the fourth lens 61b located closer to the light emission side than the third lens 61a. The diameter of the fourth lens 61b is smaller than the diameter of the fifth lens 61c located closer to the light emission side than the fourth lens 61b. That is, the lenses 61a, 61b, and 61c configuring the pickup optical system 61 have a larger outer diameter in the radial direction orthogonal to the optical axis of the pickup optical system 61 as the lenses 61a, 61b, and 61c are further away from the wavelength conversion unit 30. The optical axis of the pickup optical system 61 coincides with the optical axis AX3 of the condensing optical system 60.

Wavelength Conversion Unit

Figure 5:
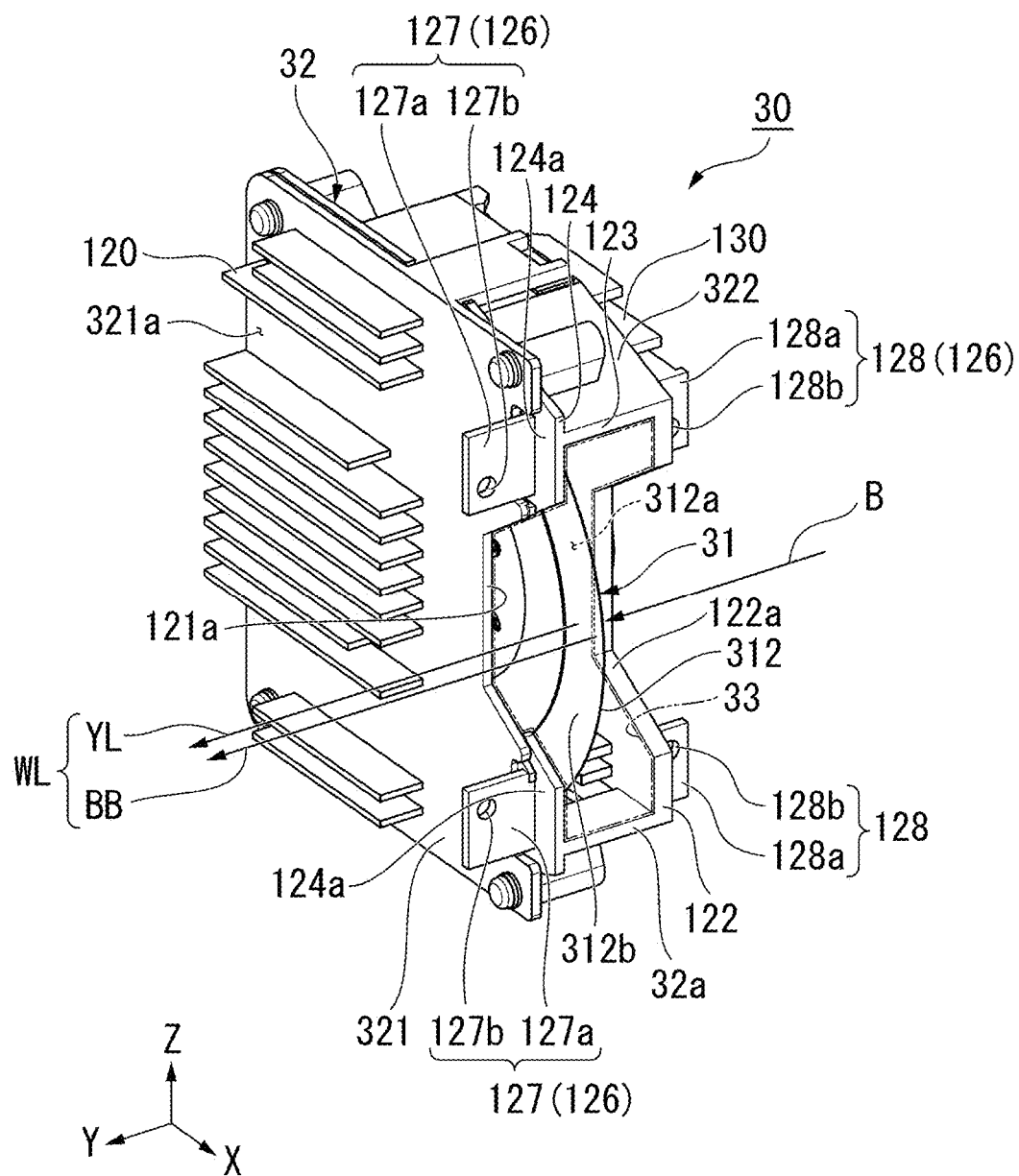
FIG. 5 is a perspective view showing the configuration of a wavelength conversion unit.
Figure 6A:
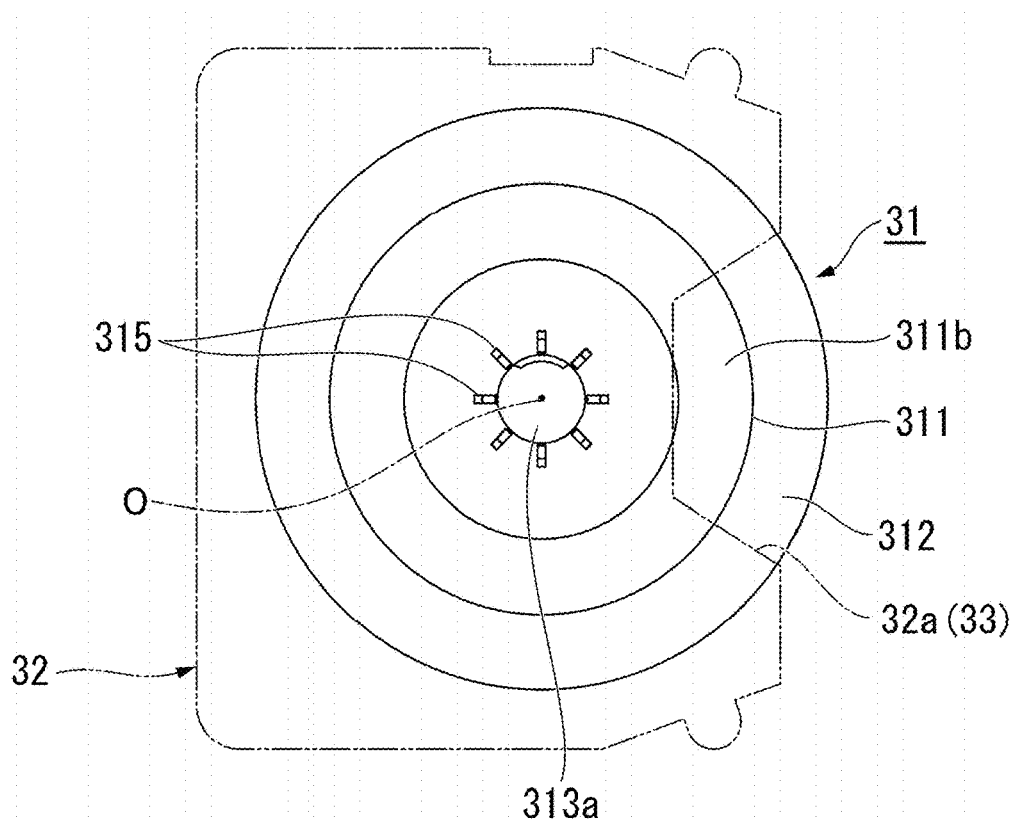
FIG. 6A is a diagram showing the configuration on a light incident surface side of a wavelength conversion wheel.
Figure 6B:
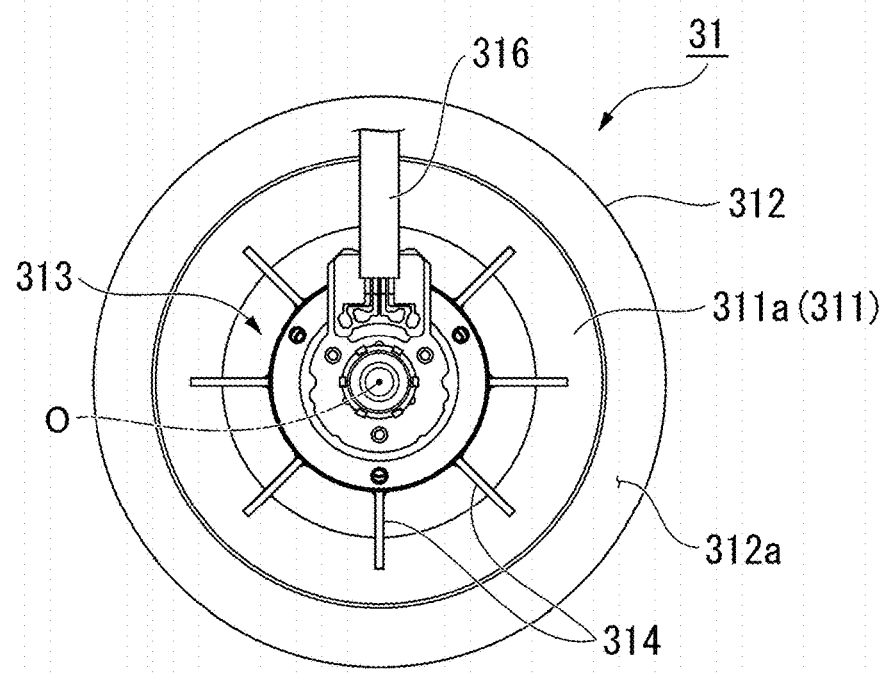
FIG. 6B is a diagram showing the configuration on a light emission surface side of the wavelength conversion wheel.

Subsequently, the configuration of the wavelength conversion unit 30 is explained. FIG. 5 is a perspective view showing the configuration of the wavelength conversion unit 30. FIG. 6A is a diagram showing the configuration on a light incident surface side of the wavelength conversion wheel 31. FIG. 6B is a diagram showing the configuration on a light emission surface side of the wavelength conversion wheel 31.

As shown in FIG. 5, the wavelength conversion unit 30 includes the wavelength conversion wheel 31 and a wheel housing 32.

As shown in FIGS. 6A and 6B, the wavelength conversion wheel 31 includes a wheel substrate 311, a wavelength conversion element 312, and a rotation driving section 313. The rotation driving section 313 is configured by, for example, a motor. Electric power is supplied to the rotation driving section 313 via a flexible cable 316. The rotation driving section 313 includes a rotation supporting section 313a capable of rotating centering on a center axis O. The rotation supporting section 313a supports the wheel substrate 311 to be capable of rotating centering on the center axis O.

The wheel substrate 311 is configured from an annular metal plate excellent in heat dissipation such as aluminum or copper.

The wavelength conversion element 312 is provided along the outer circumference of the wheel substrate 311. The wavelength conversion element 312 is formed in a ring shape around the center axis O and has an annular shape projecting in a brim shape from the outer circumference of the wheel substrate 311 toward the radial direction outer side. The radial direction outer side means a direction that is orthogonal to the center axis O and away from the center axis O.

As shown in FIG. 5, the wavelength conversion element 312 makes the excitation light B emitted from the light emitting element 21 of the light source unit 20 incident from a rear surface 312a and emits, from a front surface 312b, yellow fluorescent light YL obtained by wavelength-converting the excitation light B. That is, the wavelength conversion element 312 is a light transmissive wavelength conversion element that makes the excitation light B incident from the first surface 312a and emits the wavelength-converted light YL from the second surface 312b.

As the wavelength conversion element 312, YAG:Ce obtained by adding cerium ions, for example, Ce3+ to, for example, a garnet crystal (YAG) of $Y_3Al_5O_{12}$. A not-shown appropriate scattering element may be included in the wavelength conversion element 312.

The wavelength conversion wheel 31 in this embodiment is a so-called transmissive phosphor wheel. Specifically, the wavelength conversion element 312 transmits a part of the excitation light B made incident from the rear surface 312a and emits the part of the excitation light B from the front surface 312b together with the fluorescent light YL. Accordingly, the wavelength conversion element 312 emits the white illumination light WL obtained by combining blue component light BB, which is a part of the excitation light B, and the fluorescent light YL.

As shown in FIG. 6B, the wheel substrate 311 in this embodiment includes a plurality of fins 314 provided on the rear surface 312a side of the wavelength conversion element 312 on which the excitation light B is made incident. The plurality of fins 314 are provided on a rear surface 311b of the wheel substrate 311. The plurality of fins 314 are disposed around the center axis O to radially extend.

As shown in FIG. 6A, the wheel substrate 311 in this embodiment includes a plurality of fins 315 provided on the front surface 312b side of the wavelength conversion element 312 that emits the excitation light B. The plurality of fins 315 are provided on a front surface 311a of the wheel substrate 311. The fins 315 are radially provided around the center axis O. In the case of this embodiment, temperature easily rises on the light incident side of the wheel substrate 311 compared with the light emission side. Therefore, a size of the fins 314 on the light incident side is set larger than a size of the fins 315 on the light emission side. A size relation between the fins 314 and 315 is not limited to this. The fins 314 and 315 may have the same size or the fins 315 may be larger than the fins 314.

With the wavelength conversion wheel 31 in this embodiment, it is possible to generate an air current around the wavelength conversion element 312 at a rotation time with the fins 314 and 315 provided on both the surfaces of the wheel substrate 311 and cool the wavelength conversion element 312. Consequently, it is possible to generate bright fluorescent light YL by improving wavelength conversion efficiency of the wavelength conversion element 312.

The wheel housing 32 houses the wavelength conversion wheel 31 as shown in FIG. 3. The wheel housing 32 includes a first housing 321, a second housing 322, and a wheel sealing member 323 disposed between the first housing 321 and the second housing 322. The first housing 321 and the second housing 322 are fixed to each other in a sealed state via the wheel sealing member 323. The first housing 321 and the second housing 322 are configured by a metal member excellent in heat dissipation such as aluminum or stainless steel.

The first housing 321 is a plate-like member and includes a plurality of heat radiation fins 120 provided on a surface 321a and a coupling section 121 extending to the second housing 322 side and coupled to the second housing 322. The first housing 321 is fixed to the second housing 322 via the screw members 24. Screw holes 321H for inserting the screw members 24 are provided at four corners of the first housing 321. A cutout 121a is provided at the outer edge on the right side +X when viewed from a position on the +Y side. The cutout 121a has a substantially chevron shape.

The second housing 322 holds the wavelength conversion wheel 31. The wavelength conversion wheel 31 is, for example, fixed to a bottom plate section 122 of the second housing 322 via not-shown screw members.

Figure 10:
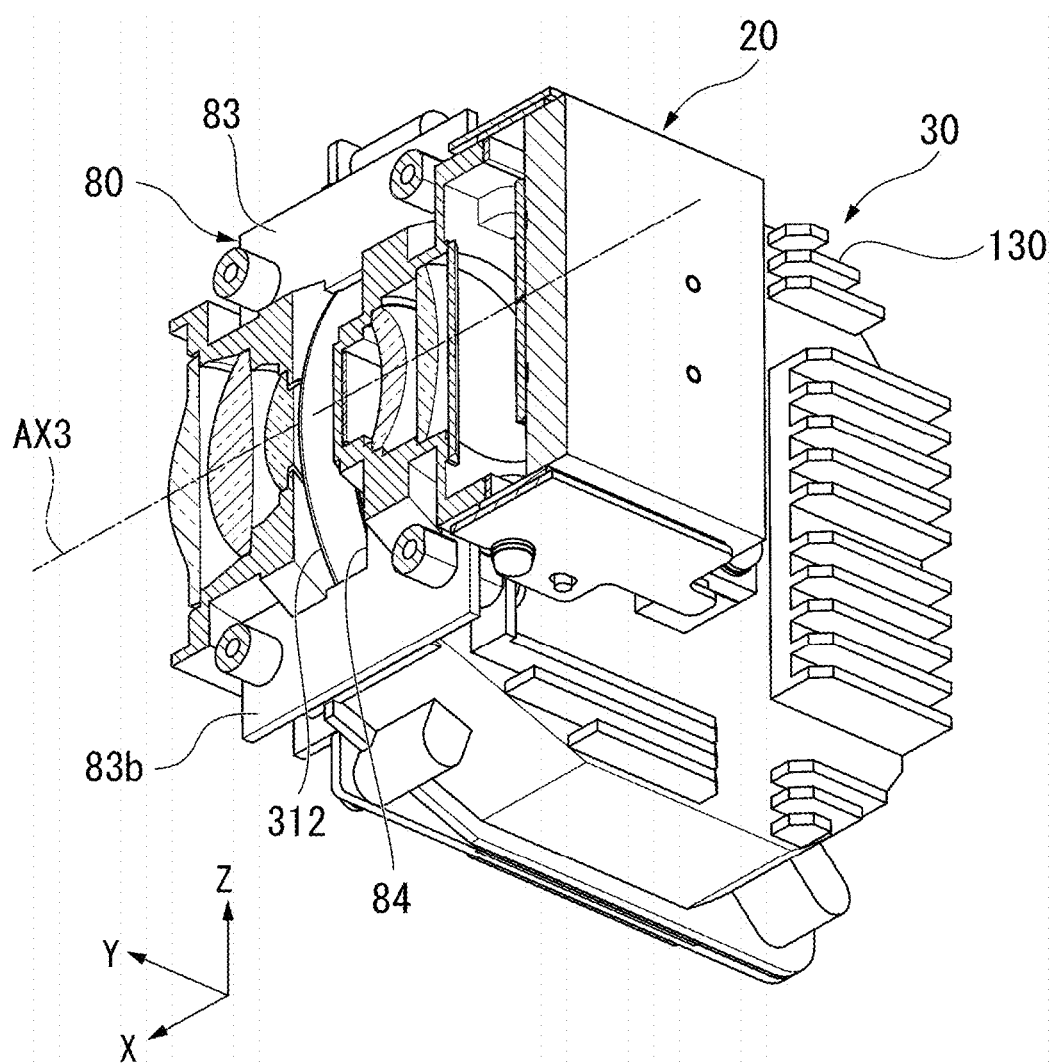
FIG. 10 is a perspective view showing the configuration of a cross section by a surface including a X-X line in FIG. 4.

The second housing 322 includes the bottom plate section 122 that holds the wavelength conversion wheel 31, a side plate section 123 surrounding the outer edge portions in three directions of the bottom plate section 122, a flange section 124 provided on the opposite side of the bottom plate section 122 in the side plate section 123, a screw fastening section 125, and an attaching section 126. In the second housing 322, as shown in FIGS. 3 and 10, a plurality of heat radiation fins 130 are provided on the surface of the bottom plate section 122. Specifically, the wheel housing 32 in this embodiment includes the plurality of heat radiation fins 130 provided in a position not overlapping the optical housing 62 in the front-rear direction Y extending along the optical axis AX3 on the surface of the bottom plate section 122 of the second housing 322 facing the light source unit 20 side. Consequently, it is possible to improve the heat dissipation of the wheel housing 32 while preventing interference of the heat radiation fins 130 and the optical housing 62.

As shown in FIG. 3, in the bottom plate section 122, a cutout 122a is provided at the outer edge not surrounded by the side plate section 123. The cutout 122a has a substantially chevron shape. The shape of the cutout 122a of the bottom plate section 122 corresponds to the shape of the cutout 121a of the first housing 321. That is, the cutouts 121a and 122a are formed to overlap each other when the wheel housing 32 is viewed in a plane view.

The flange section 124 is a part opposed to the first housing 321 and has a substantially C-shaped plane shape. Overhanging sections overhanging to the inner side and overlapping the external shape of the bottom plate section 122 in a plane view are respectively provided at both distal ends of the flange section 124. The wheel sealing member 323 is provided along the shape of the flange section 124.

The screw fastening section 125 is a part to which the screw members 24 for fixing the first housing 321 to the second housing 322 are fastened. The screw fastening section 125 is provided integrally with a part of the flange section 124.

As shown in FIG. 3, the attaching section 126 is a member for fixing the wavelength conversion wheel 31 of the wavelength conversion unit 30 to the optical housing 62 of the optical unit 40 with the screw members 24.

As shown in FIG. 5, the attaching section 126 includes a front side attaching section 127, which is a first attaching section, and a rear side attaching section 128, which is a second attaching section.

The front side attaching section 127 includes a pair of front side attachment plates 127a provided in overhanging sections 124a of the flange section 124. In the front side attachment plates 127a, screw holes 127b for inserting the screw members 24 are provided. The front side attachment plates 127a are provided to be orthogonal to the overhanging sections 124a and to be opposed to an attachment plate 83 of an attaching section 80 of the optical housing 62. The front side attachment plates 127a are arranged in a row in the up-down direction Z. Specifically, the positions in the left-right direction X of the screw holes 127b of the front side attachment plates 127a are equal.

The rear side attaching section 128 is provided on the rear side −Y, which is the opposite side of the first housing 321 in the bottom plate section 122 of the second housing 322. The rear side attaching section 128 includes a pair of rear side attachment plates 128a. In the rear side attachment plates 128a, screw holes 128b for inserting the screw members 24 are provided.

The rear side attachment plates 128a are provided to be orthogonal to the bottom plate section 122 and to be opposed to the attachment plate 83 of the attaching section 80 of the optical housing 62. The rear side attachment plates 128 are arranged in a row in the up-down direction Z. Specifically, positions in the left-right direction X of the screw holes 128b of the rear side attachment plates 128a are equal.

Positions in the up-down direction Z of the front side attachment plates 127a and the rear side attachment plates 128a arranged in the front-rear direction Y are equal. Specifically, positions in the up-down direction Z of the screw holes 127b of the front side attachment plates 127a and the screw holes 128b of the rear side attachment plates 128a are equal.

As shown in FIG. 5, the wheel housing 32 in this embodiment houses the wavelength conversion wheel 31 to expose a part of the wavelength conversion wheel 31. The wheel housing 32 includes a wheel opening section 33, which is a first opening section, for exposing a part of the wavelength conversion wheel 31.

The wheel opening section 33 is configured by at least one of the first housing 321 and the second housing 322. The wheel opening section 33 is configured by an end face of a portion where the cutout 121a is formed in the first housing 321, an end face of the overhanging section 124a in the second housing 322, an end face of the side plate section 123, and an end face of a portion where the cutout 122a is formed in the bottom plate section 122. That is, in the case of this embodiment, the wheel opening section 33 is configured by the first housing 321 and the second housing 322. In the following explanation, end faces of the first housing 321 and the second housing 322 configuring the wheel opening section 33 are referred to as "wheel opening end face 32a".

As shown in FIGS. 5 and 6A, the wavelength conversion element 312, which is a part of the wavelength conversion wheel 31, is projected further to the outer side than the wheel opening end face 32a of the wheel housing 32 via the wheel opening section 33.

Subsequently, a specific configuration of the optical housing 62 is explained.

Figure 7:
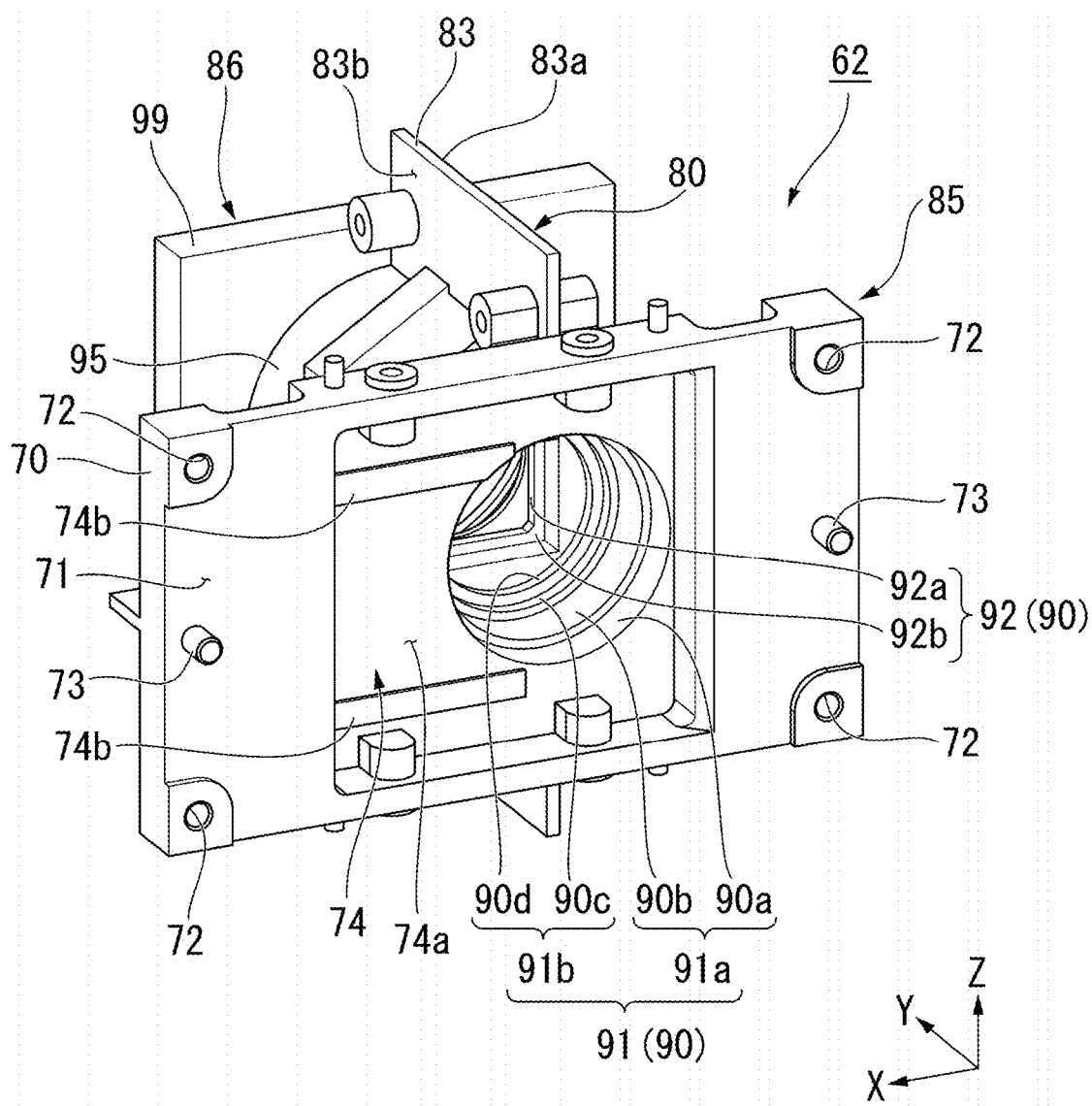
FIG. 7 is a perspective view showing the configuration of an optical housing.

FIG. 7 is a perspective view showing a configuration on the rear side −Y of the optical housing 62.

Figure 8A:
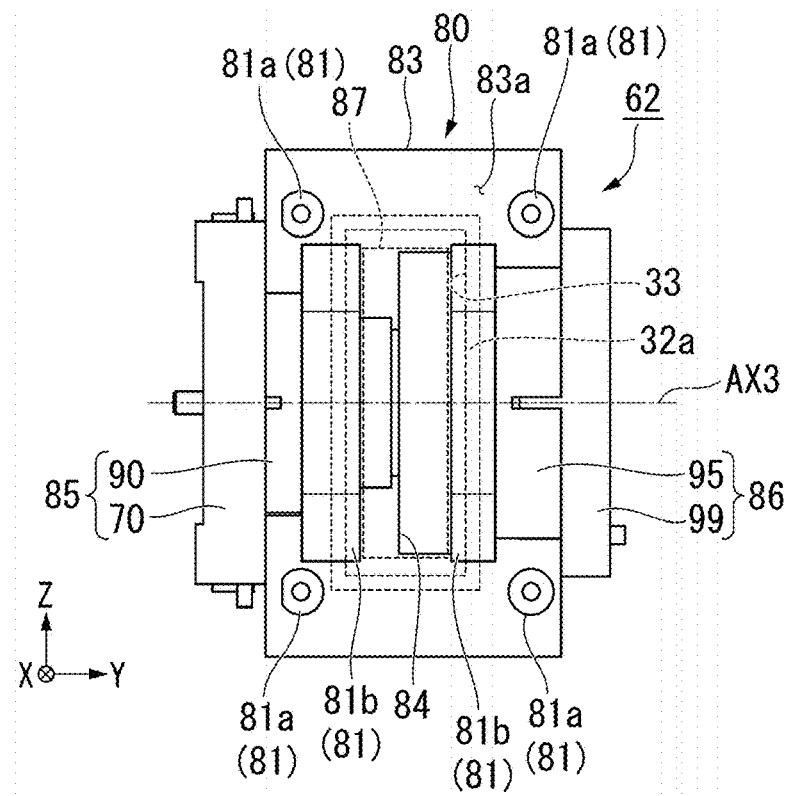
FIG. 8A is a side view of the optical housing viewed from a −X side.
Figure 8B:
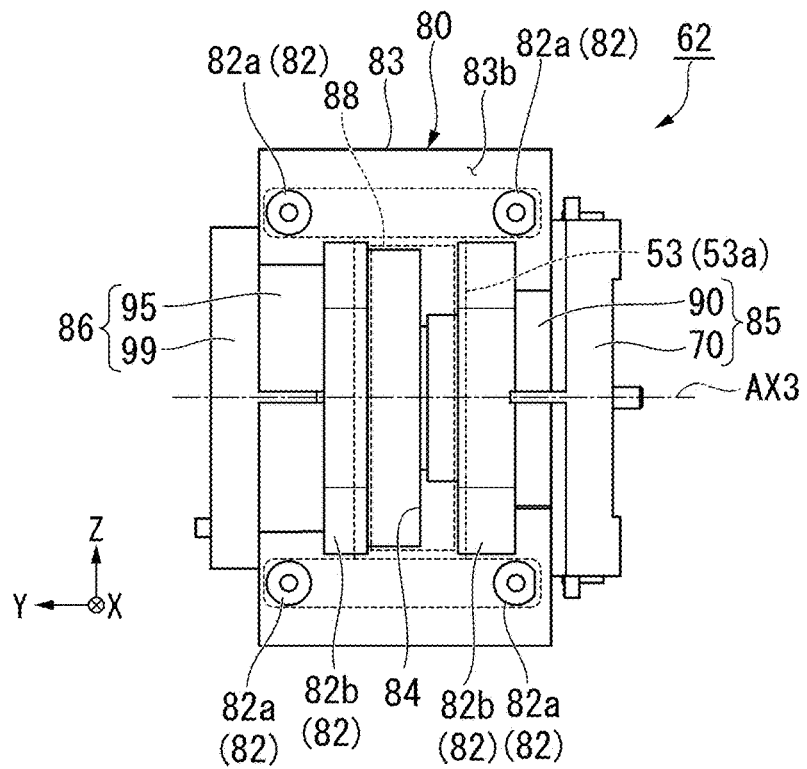
FIG. 8B is a side view of the optical housing viewed from a +X side.

FIGS. 8A and 8B are side views showing a main part configuration of the optical housing 62. FIG. 8A is a side view of the optical housing 62 viewed from the −X side. FIG. 8B is a side view of the optical housing 62 viewed from the +X side.

Figure 9:
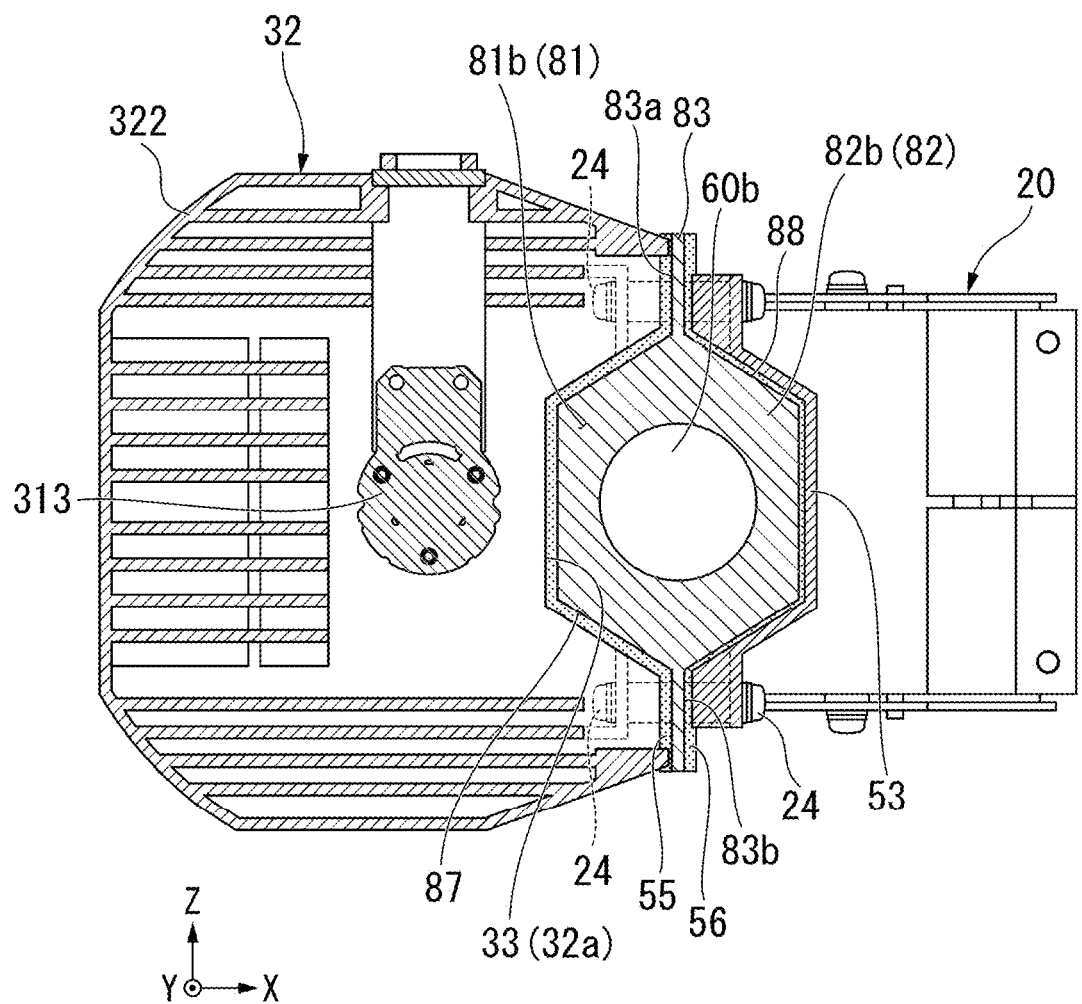
FIG. 9 is a sectional view by a XI-XI line arrow view of FIG. 4.

FIG. 9 is a sectional view by a XI-XI line arrow view of FIG. 4. FIG. 10 is a perspective view showing a configuration in a cross section by a surface including a X-X line in FIG. 4.

As shown in FIG. 7, the optical housing 62 includes the attaching section 80, a first member 85, and a second member 86. In this embodiment, the attaching section 80, the first member 85, and the second member 86 are integrally formed. That is, the optical housing 62 in this embodiment is configured by a single member. As shown in FIGS. 3 and 4, the first member 85 is a member that holds the condensing optical system 60 and the second member 86 is a member that holds the pickup optical system 61.

As shown in FIG. 2, the optical housing 62 includes a holding section 64 held by the light source holding member 18 of the exterior housing 7 via the screw members 9. As shown in FIG. 2, the holding section 64 includes screw fixing holes 64a into which the screw members 9 fastened to the screw fastening sections 18a of the light source holding member 18 are inserted and positioning holes 64b into which the positioning sections 18b of the light source holding member 18 are inserted.

As shown in FIGS. 8A and 8B, the first member 85 includes a light-source fixing section 70 and a first tubular section 90. The light source unit 20 is fixed to the light-source fixing section 70 via the screw members 24 (see FIG. 3).

As shown in FIG. 7, the light-source fixing section 70 includes a holding surface 71, screw fastening sections 72, and a pair of positioning pins 73. The holding surface 71 holds the base member 23 of the light source unit 20 as shown in FIGS. 3 and 4. The screw fastening sections 72 are parts that are provided at four corners of the holding surface 71 having a rectangular shape and to which the screw members 24 for fixing the light source unit 20 are fastened. The pair of positioning pins 73 is respectively provided in positions equivalent to both the sides in the left-right direction X and the center in the up-down direction Z on the holding surface 71. As shown in FIGS. 3 and 4, the pair of positioning pins 73 is inserted into positioning holes 23a1 formed in the fixing section 23a of the base member 23 to position the base member 23 of the light source unit 20 with respect to the light-source fixing section 70.

As shown in FIGS. 4 and 7, the optical housing 62 in this embodiment includes a prism supporting section 74, which is a first supporting section that supports the prism member 63 of the condensing optical system 60. The prism supporting section 74 is provided in the light-source fixing section 70.

The prism supporting section 74 is formed to recess to the wavelength conversion wheel 31 side from the holding surface 71 that holds the light source unit 20. The prism supporting section 74 includes a supporting surface 74a that supports the prism member 63. In the case of this embodiment, a pair of supporting members 74b that supports the prism member 63 is provided on the supporting surface 74a of the prism supporting section 74. The pair of supporting members 74b is respectively plate-like parts extending in the left-right direction X and is provided on the supporting surface 74a to be spaced in the up-down direction Z. Based on such a configuration, the prism supporting section 74 can stably support the prism member 63 in a predetermined position on the supporting surface 74a via the pair of supporting members 74b.

As shown in FIG. 4, the prism member 63 is disposed on the right side +X with respect to the optical axis AX3 of the condensing optical system 60 when viewed from a position on the +Y side. The center of the light source unit 20 is located closer to the right side +X than the optical axis AX3. Accordingly, in the left-right direction X, the distance from the optical axis AX3 to the end face on the left side −X of the light-source fixing section 70 of the optical housing 62 is shorter than the distance from the optical axis AX3 to the end face on the right side +X of the light-source fixing section 70 of the optical housing 62. That is, a projection amount of the optical housing 62 with respect to the optical axis AX3 is larger on the left side −X than the right side +X.

The first tubular section 90 of the optical housing 62 includes a lens supporting section 91, which is a second supporting section, and a diffusion-plate supporting section 92. The lens supporting section 91 is provided on the inner surface side of the first tubular section 90 and is formed to recess to the wavelength conversion wheel 31 side from the supporting surface 74a of the prism supporting section 74.

The lens supporting section 91 includes a first step section 91a that supports the first lens 60a and a second step section 91b that supports the second lens 60b.

The first step section 91a is configured by a step between a first inner circumferential surface 90a of the first tubular section 90 and a second inner circumferential surface 90b having a smaller inner diameter than the first inner circumferential surface 90a. The first lens 60a is supported in the lens supporting section 91 by the first step section 91a. The first lens 60a may be fit in the first step section 91a and fixed or may be fixed via a not-shown adhesive.

The second step section 91b is a step between a third inner circumferential surface 90c having a smaller inner diameter than the second inner circumferential surface 90b and a fourth inner circumferential surface 90d having a smaller inner diameter than the third inner circumferential surface 90c. The second lens 60b is supported in the lens supporting section 91 by the second step section 91b. The second lens 60b may be fit in the second step section 91b and fixed or may be fixed via a not-shown adhesive.

The diffusion-plate supporting section 92 is formed to recess to the wavelength conversion wheel 31 side from the bottom surface of the lens supporting section 91. The diffusion-plate supporting section 92 includes a supporting surface 92a that supports the diffusion plate 65 and an opening 92b provided on the supporting surface 92a. The opening 92b makes the excitation light B transmitted through the diffusion plate 65 incident on the wavelength conversion wheel 31.

The second member 86 of the optical housing 62 includes a connecting section 99 and a second tubular section 95. As shown in FIG. 7, the connecting section 99 is provided to overhang to, from the outer edge of the distal end on the front side +Y of the second tubular section 95, the radial direction outer side to which the connecting section 99 separates in a direction orthogonal to the optical axis AX3. The connecting section 99 is a member that connects the light source device 2 to the uniform illumination optical system 5 shown in FIG. 1.

Based on such a configuration, the light source device 2 in this embodiment can efficiently make the illumination light WL incident on the uniform illumination optical system 5 via the connecting section 99 of the optical housing 62.

The second tubular section 95 mainly configured by a lens supporting section 96 that supports the pickup optical system 61. The lens supporting section 96 is provided on the inner surface of the second tubular section 95. The lens supporting section 96 includes a third step section 96a that supports the third lens 61a, a fourth step section 96b that supports the fourth lens 61b, and a fifth step section 96c that supports the fifth lens 61c.

The fifth step section 96c is configured by a step between a fifth inner circumferential surface 95a located closest to the front side +Y in the second tubular section 95 and a sixth inner circumferential surface 95b located closer to the rear side −Y and having a smaller inner diameter than the fifth inner circumferential surface 95a. The fifth lens 61c is supported in the lens supporting section 96 by the fifth step section 96c. The fifth lens 61c may be fit in the fifth step section 96c and fixed or may be fixed via a not-shown adhesive.

The fourth step section 96b is configured by a step between a seventh inner circumferential surface 95c located closer to the rear side −Y and having a smaller inner diameter than the sixth inner circumferential surface 95b and an eighth inner circumferential surface 95d located closer to the rear side −Y and having a smaller inner diameter than the seventh inner circumferential surface 95c. In the case of this embodiment, a ninth inner circumferential surface 95e connecting the sixth inner circumferential surface 95b and the seventh inner circumferential surface 95c is formed as a taper surface narrowed in an inner diameter toward the rear side −Y.

The fourth lens 61b is supported in the lens supporting section 96 by the fourth step section 96b. The fourth lens 61b may be fit in the fourth step section 96b and fixed or may be fixed via a not-shown adhesive.

The third step section 96a is configured by a step between a tenth inner circumferential surface 95f located closer to the rear side −Y and having a smaller inner diameter than the eighth inner circumferential surface 95d and an eleventh inner circumferential surface 95g located closer to the rear side −Y and having a smaller inner diameter than the tenth inner circumferential surface 95f.

In the case of this embodiment, the eighth inner circumferential surface 95d is formed as a taper surface narrowed in an inner diameter stepwise toward the rear side −Y.

The third lens 61a is supported in the lens supporting section 96 by the third step section 96a. The third lens 61a may be fit in the third step section 96a and fixed or may be fixed via a not-shown adhesive.

In this embodiment, the outer diameters of the lenses configuring the condensing optical system 60 and the pickup optical system 61 decrease as the lenses are closer to the wavelength conversion unit 30.

Consequently, in the optical housing 62 in this embodiment, a diameter-reduced section 69 is provided in a position corresponding to the second lens 60b of the condensing optical system 60 and the third lens 61a of the pickup optical system 61. The diameter-reduced section 69 is a part having a relatively smaller outer diameter than the other portions in the optical housing 62.

In this embodiment, the wavelength conversion unit 30 is disposed in the diameter-reduced section 69 of the optical housing 62. Since the wavelength conversion unit 30 is attached to the optical housing 62 from the radial direction outer side, an increase in the dimension in the radial direction of the light source device 2 is prevented by disposing the wavelength conversion unit 30 in the diameter-reduced section 69.

As shown in FIGS. 8A and 8B, the attaching section 80 is a part for attaching the wavelength conversion unit 30 to the optical housing 62. In this embodiment, by using the attaching section 80, the wavelength conversion unit 30 including the wavelength conversion wheel 31 can be attached to the optical housing 62 from a plurality of directions with respect to the optical axis AX3 of the condensing optical system 60.

The attaching section 80 includes a first attachment structure 81, a second attachment structure 82, and an attachment plate 83 extending along a YZ plane. The attachment plate 83 connects the first tubular section 90 and the second tubular section 95.

As shown in FIGS. 7 to 8B, the attachment plate 83 includes a first attachment surface 83a extending along the optical axis AX3 of the condensing optical system 60 and facing the left side −X when viewed from a position on the +Y side, a second attachment surface 83b extending along the optical axis AX3 of the condensing optical system 60 and facing the right side +X opposite to the first attachment surface 83a when viewed from a position on the +Y side, and a through-hole 84.

The attachment plate 83 is located on the optical axis AX3 of the condensing optical system 60.

In this embodiment, the attachment plate 83 being located on the optical axis AX3 of the condensing optical system 60 refers to a state in which the optical axis AX3 overlaps the first attachment surface 83a or the second attachment surface 83b or a state in which the optical axis AX3 is located between the first attachment surface 83a and the second attachment surface 83b.

In the case of this embodiment, in the attachment plate 83, the optical axis AX3 is located in the middle between the first attachment surface 83a and the second attachment surface 83b. That is, in the attachment plate 83 in this embodiment, the distance from the optical axis AX3 to the first attachment surface 83a and the distance from the optical axis AX3 to the second attachment surface 83b are equal.

The through-hole 84 pierces through the attachment plate 83 in the plate thickness direction. A plane shape of the through-hole 84 is a rectangle. When the wavelength conversion unit 30 is attached to the attaching section 80, a part of the wavelength conversion wheel 31 is projected from one side to the other side of the attachment plate 83 through the through-hole 84.

The first attachment structure 81 enables the wavelength conversion unit 30 to be attached to the first attachment surface 83a. As shown in FIG. 3, in the light source device 2 in this embodiment, when viewed from a position on the +Y side, the wavelength conversion unit 30 is attached to the left side −X of the optical housing 62 via the first attachment structure 81. In the case of this embodiment, the wavelength conversion unit 30 is disposed between the heat radiating section 51 and the optical unit 40.

As shown in FIG. 8A, the first attachment structure 81 is provided on the first attachment surface 83a. The first attachment structure 81 includes a plurality of screw fastening sections 81a and a pair of pedestals 81b projecting from the first attachment surface 83a. In the case of this embodiment, four screw fastening sections 81a are provided. As shown in FIG. 3, the screw members 24 for attaching the wavelength conversion unit 30 are respectively fastened to the screw fastening sections 81a. The pair of pedestals 81b is disposed to be separated in the front-rear direction Y. As shown in FIG. 9, the pedestals 81b are seats having a trapezoidal plane shape when viewed from a direction extending along the optical axis AX3 and function as seats for setting the wavelength conversion unit 30. The pedestals 81b have an external shape corresponding to the wheel opening end face 32a of the wheel housing 32.

In the case of this embodiment, the width in the front-rear direction Y of the pedestal 81b on the rear side −Y is larger than the width in the front-rear direction Y of the pedestal 81b on the front side +Y. This is because of a difference due to the width of contact with the wavelength conversion unit 30. Depending on the shape on the wavelength conversion unit 30 side, the widths of the pedestals 81b may be set the same or the width on the front side +Y may be set larger than the width on the rear side −Y.

The optical housing 62 in this embodiment includes a left side opening section 87, which is a second opening section, provided on the first attachment surface 83a side of the attaching section 80. The left side opening section 87 is an opening defined by a boundary between a space sandwiched by the pair of pedestals 81b and the outside of the space.

As shown in FIGS. 3 and 5, when the wavelength conversion unit 30 is attached to the optical housing 62, the front side attachment plates 127a of the front side attaching section 127 and the rear side attachment plates 128a of the rear side attaching section 128 and the screw fastening sections 81a of the first attachment structure 81 are fixed by the screw members 24. As shown in FIG. 8A, in the wheel housing 32, the wheel opening end face 32a of the wheel housing 32 configuring the wheel opening section 33 collides with the pedestals 81b and the attachment plate 83 of the first attachment structure 81 such that the wheel opening section 33 planarly surrounds the left side opening section 87.

In the wavelength conversion unit 30, the wavelength conversion element 312, which is a part of the wavelength conversion wheel 31, is located on an optical path between the condensing optical system 60 and the pickup optical system 61 in a state in which the wavelength conversion unit 30 is attached to the attaching section 80 of the optical housing 62 of the optical unit 40.

That is, in this embodiment, in the optical unit 40 and the wavelength conversion unit 30, the wavelength conversion element 312, which is a part of the wavelength conversion wheel 31 exposed via the wheel opening section 33 of the wheel housing 32, is disposed on the optical path between the condensing optical system 60 and the pickup optical system 61 via the left side opening section 87 of the optical housing 62.

In the case of this embodiment, as shown in FIGS. 5 and 6A, the wavelength conversion element 312, which is a part of the wavelength conversion wheel 31, projects further to the outer side than the wheel opening end face 32a of the wheel housing 32 via the wheel opening section 33. Accordingly, when the wavelength conversion unit 30 is attached to the optical housing 62, the wavelength conversion element 312 projecting from the wheel opening end face 32a is likely to interfere with the attachment plate 83.

In contrast, in the attaching section 80 in this embodiment, as shown in FIGS. 5 and 10, the through-hole 84 is provided in a position corresponding to the wavelength conversion element 312 projecting from the wheel opening end face 32a to locate the wavelength conversion element 312 projecting from the wheel opening end face 32a on the opposite side of the attachment plate 83 via the through-hole 84. In this way, the wavelength conversion element 312 is disposed on the optical axis AX3 of the condensing optical system 60. Therefore, it is possible to efficiently make the excitation light B incident on the wavelength conversion element 312 via the condensing optical system 60.

In the case of this embodiment, since the optical axis of the pickup optical system 61 coincides with the optical axis AX3 of the condensing optical system 60, the illumination light WL emitted from the wavelength conversion element 312 can be efficiently taken into the pickup optical system 61. Accordingly, it is possible to improve light use efficiency of the illumination light WL.

In this embodiment, as shown in FIG. 3, a first sealing member 55 is disposed between the wavelength conversion unit 30 and the optical housing 62. The wavelength conversion unit 30 is fixed to the first attachment structure 81 of the optical housing 62 by the screw members 24.

As shown in FIG. 9, the first sealing member 55 is pressed between the wheel opening end face 32a of the wheel housing 32 and the pedestal 81b and the first attachment surface 83a of the first attachment structure 81. A gap between the left side opening section 87 of the optical housing 62 and the wheel opening section 33 of the wheel housing 32 is satisfactorily closed by the first sealing member 55.

In this way, the optical unit 40 and the wavelength conversion unit 30 are fixed in a state in which the left side opening section 87 of the optical housing 62 and the wheel opening section 33 of the wheel housing 32 are sealed.

The second attachment structure 82 enables the wavelength conversion unit 30 to be attachable to the second attachment surface 83b. As shown in FIG. 8B, the second attachment structure 82 includes a plurality of screw fastening sections 82a and a pair of pedestals 82b provided on the second attachment surface 83b. In the case of this embodiment, four screw fastening sections 82a are provided.

The second attachment structure 82 has the same configuration as the configuration of the first attachment structure 81. Accordingly, in the optical housing 62, the wavelength conversion unit 30 can be attached to the second attachment structure 82 by changing an attaching direction of the wavelength conversion unit 30.

In the case of this embodiment, as explained above, the wavelength conversion unit 30 is attached to the optical housing 62 using the first attachment structure 81. Therefore, the second attachment structure 82 is not used to attach the wavelength conversion unit 30.

The optical housing 62 in this embodiment includes a right side opening section 88, which is a third opening section, provided on the second attachment surface 83b side of the attaching section 80. The right side opening section 88 is an opening defined by a boundary between a space sandwiched by the pair of pedestals 82b and the outside of the space. The right side opening section 88 is opposed to the left side opening section 87 across the attachment plate 83 of the attaching section 80.

The condensing optical system 60 and the pickup optical system 61 on which the excitation light B is made incident generate heat. In the light source device 2 in this embodiment, as shown in FIG. 2, the lid body 53 thermally connected to the second heat conducting section 52b of the second cooling section 50B is attached to the second attachment structure 82. Consequently, cooling performance of the condensing optical system 60 and the pickup optical system 61 is improved by radiating heat received from the optical housing 62.

As shown in FIG. 3, the lid body 53 includes a lid main body section 53a and an attaching section 53b. The lid main body section 53a of the lid body 53 has an external shape corresponding to the pedestals 82b of the second attachment structure 82 and the pedestals 81b having the same shape as the pedestals 82b.

When the lid body 53 is attached to the optical housing 62, the attaching section 53b of the lid body 53 and the screw fastening sections 82a of the second attachment structure 82 are fixed by the screw members 24. At this time, as shown in FIG. 8B, the lid main body section 53a of the lid body 53 collides with the pedestals 82b and the attachment plate 83 of the second attachment structure 82 to close the right side opening section 88.

In this embodiment, as shown in FIG. 3, a second sealing member 56 is disposed between the lid body 53 and the optical housing 62. The lid body 53 is fixed to the second attachment structure 82 of the optical housing 62 by the screw members 24. Consequently, a gap between the right side opening section 88 of the optical housing 62 and the lid main body section 53a of the lid body 53 is satisfactorily closed by the second sealing member 56. Accordingly, as shown in FIG. 8B, the lid body 53 is fixed to the optical housing 62 in a state in which the lid body 53 covers the right side opening section 88 of the optical housing 62 in a sealed state.

As explained above, the light source device 2 in this embodiment includes the prism member 63 that changes the optical path of the excitation light B2 emitted from the second light emitting element 212 to bring the excitation light B2 closer to the excitation light B1 emitted from the first light emitting element 211 and makes the excitation light B2 incident on the first lens 60a of the condensing optical system 60. The optical housing 62 includes the prism supporting section 74 that supports the prism member 63 and the lens supporting section 91 that supports the condensing optical system 60. The holding surface 71 of the optical housing 62 and the base member 23 are fixed.

The light source device 2 in this embodiment is configured by the three units, that is, the light source unit 20, the wavelength conversion unit 30, and the optical unit 40. The prism member 63 that changes the optical path of the excitation light B2 emitted from the second light emitting element 212 and makes the excitation light B2 incident on the condensing optical system 60 is disposed in the optical housing 62 together with the condensing optical system 60. Therefore, it is possible to generate bright illumination light WL while reducing the device configuration of the light source device 2 in size.

In the case of this embodiment, the second reflection surface 63b of the prism member 63 is located between the first lens 60a and the first mounting substrate 221 in the front-rear direction Y extending along the optical axis AX3 of the condensing optical system 60. Therefore, it is possible to prevent an increase in the size of the light source device 2 in the left-right direction X, which is an arranging direction of the first mounting substrate 221 and the second mounting substrate 222.

In the case of this embodiment, the base member 23 includes the recess 23b. The first mounting substrate 221 and the second mounting substrate 222 are set in the recess 23b.

With this configuration, when the holding surface 71 of the optical housing 62 and the base member 23 of the light source unit 20 are fixed, a housing space for the light emitting element 21 can be secured in the recess 23b.

In the case of this embodiment, in the left-right direction X crossing the optical axis AX3 of the condensing optical system 60, when viewed from a position on the +Y side, the wavelength conversion unit 30 is disposed on the left side −X in the left-right direction X with respect to the optical housing 62 and the prism member 63 is disposed on the right side +X in the left-right direction X with respect to the optical axis AX3 in the optical housing 62.

With this configuration, a space can be secured on the right side +X, which is the opposite side of the wavelength conversion unit 30 with respect to the optical unit 40. Accordingly, it is possible to reduce the size of the device configuration of the projector 1 by, for example, disposing the projector components in the space on the right side +X of the optical unit 40.

In the case of this embodiment, the wheel housing 32 includes the plurality of heat radiation fins 130 in the position not overlapping the optical housing 62 in the front-rear direction Y extending along the optical axis AX3 on the surface of the second housing 322 facing the light source unit 20 side.

With this configuration, it is possible to improve heat dissipation of the wheel housing 32 while effectively using a space not overlapping the optical housing 62 on the surface of the second housing 322.

In the light source device 2 in this embodiment, the light source unit 20 and the optical unit 40 are fixed in the sealed state. In the optical unit 40 and the wavelength conversion unit 30, a part of the wavelength conversion wheel 31 exposed via the wheel opening section 33 of the wheel housing 32 is disposed on the optical path between the condensing optical system 60 and the pickup optical system 61 via the left side opening section 87 of the optical housing 62. The left side opening section 87 of the optical housing 62 and the wheel opening section 33 of the wheel housing 32 are fixed in the sealed state.

With the light source device 2 in this embodiment, it is possible to provide a light source device having a sealed structure in which the wavelength conversion wheel 31 is disposed on the optical path between the condensing optical system 60 and the pickup optical system 61 and the three units, that is, the light source unit 20, the wavelength conversion unit 30, and the optical unit 40 are fixed in the sealed state. Consequently, since intrusion of dust into the inside of the light source device 2 is prevented, it is possible to prevent occurrence of deficiencies such as deterioration and heat generation of components caused by dust adhering to the lenses and the wavelength conversion wheel 31. Since the light source device 2 is configured by the three units, it is possible to provide the light source device 2 excellent in assemblability.

In the case of this embodiment, in the optical housing 62, the wavelength conversion unit 30 is disposed in the diameter-reduced section 69 having the smaller outer diameter than the other portions. Accordingly, a projection amount of the wavelength conversion unit 30 from the optical housing 62 is reduced. It is possible to prevent an increase in the size of the light source device 2.

In the case of this embodiment, the optical housing 62 of the optical unit 40 and the base member 23 of the light source unit 20 are fixed in the sealed state.

With this configuration, in the light source unit 20, not the mounting substrate 22 on which the light emitting element 21 is mounted but the optical housing 62 is fixed to the base member 23. Therefore, the sealed state can be easily realized.

In the case of this embodiment, the optical path of the excitation light B2 emitted from the second light emitting element 212 can be changed by the prism member 63 to reduce the light beam width of the excitation light B made incident on the condensing optical system 60. Accordingly, it is possible to generate the bright fluorescent light YL by increasing a light amount of the excitation light B while preventing an increase in the size of the condensing optical system 60 on which the excitation light B is made incident.

In the case of this embodiment, in the first cooling section 50A that cools the optical unit 40, the heat of the base member 23 is conducted to the first heat radiating section 51a via the first heat conducting section 52a. With this configuration, flexibility of disposition of the first heat radiating section 51a is improved by changing routing of the first heat conducting section 52a. Accordingly, it is possible to provide the light source device 2 in which a layout change is easy.

In the case of this embodiment, the wheel housing 32 of the wavelength conversion unit 30 is configured by the first housing 321 and the second housing 322. The wheel opening section 33 of the wheel housing 32 is configured by the first housing 321 and the second housing 322.

With this configuration, the wheel housing 32 including the wheel opening section 33 can be configured by the two housings. Therefore, it is possible to improve assemblability of the wavelength conversion unit 30.

In the case of this embodiment, in the optical housing 62, the first member 85 that holds the condensing optical system 60 and the second member 86 that holds the pickup optical system 61 are integrally formed. Therefore, the number of components can be reduced. If the optical housing 62 is configured by a plurality of components, adjustment is necessary because of tolerance of the components. However, in this embodiment, since the optical housing 62 is configured by one component, the adjustment is unnecessary. It is possible to improve assemblability.

In the case of this embodiment, the optical unit 40 further includes the lid body 53 that covers, in the sealed state, the right side opening section 88 opposed to the left side opening section 87 of the optical housing 62.

With this configuration, the wavelength conversion unit 30 can be attached to the right side opening section 88 of the optical housing 62 as well. Accordingly, the wavelength conversion unit 30 can be attached to the optical housing 62 from both the sides in the left-right direction X. Therefore, flexibility of the layout of the wavelength conversion unit 30 is improved.

It is possible to maintain the sealed state in the light source device 2 by closing, with the lid body 53, an opening section not used to attach the wavelength conversion unit 30.

In the case of this embodiment, in the second cooling section 50B, heat received by the lid body 53 from the wavelength conversion unit 30, the condensing optical system 60, the pickup optical system 61, or the light source unit 20 via the optical housing 62 can be conducted to the second heat radiating section 51b via the second heat conducting section 52b. Accordingly, it is possible to improve cooling performance while simplifying a device configuration of the light source device 2.

In the light source device 2 in this embodiment, to enable the wavelength conversion wheel 31 to be disposed from two directions with respect to the optical axis AX3 of the condensing optical system 60, the optical unit 40 includes the attaching section 80 to which the wavelength conversion unit 30 is attached.

With the light source device 2 in this embodiment, the wavelength conversion wheel 31 can be disposed from two directions with respect to the optical housing 62 of the optical unit 40. Therefore, flexibility of the layout of the light source device 2 can be improved. Accordingly, the light source device 2 in which a layout change corresponding to specifications can be easily performed is provided.

In the case of this embodiment, the attaching section 80 includes the attachment plate 83 including the first attachment surface 83a extending along the optical axis AX3 of the condensing optical system 60 and the second attachment surface 83b opposite to the first attachment surface 83a. The wavelength conversion unit 30 is attached to one of the first attachment surface 83a and the second attachment surface 83b.

With this configuration, it is possible to realize, with the attachment plate 83, a configuration in which the wavelength conversion unit 30 is symmetrically disposed with respect to the optical axis AX3.

In the case of this embodiment, the attachment plate 83 is located on the optical axis AX3 of the condensing optical system 60.

With this configuration, the distance from the wavelength conversion unit 30 attached to the first attachment surface 83a to the optical axis AX3 and the distance from the wavelength conversion unit 30 attached to the second attachment surface 83b to the optical axis AX3 are the same. Accordingly, it is easy to align the wavelength conversion unit 30 and the optical axis AX3 and assemblability is improved.

In the case of this embodiment, the attaching unit 80 includes the first attachment structure 81 that enables the wavelength conversion unit 30 to be attached to the first attachment surface 83a and the second attachment structure 82 that enables the wavelength conversion unit 30 to be attached to the second attachment surface 83b and having the same configuration as the configuration of the first attachment structure 81.

With this configuration, it is possible to attach the wavelength conversion units 30 having the same structure to both the surfaces of the attachment plate 83. Accordingly, it is possible to provide a light source device in which a layout change can be easily performed while reducing cost by using the wavelength conversion units 30 in common irrespective of attaching directions.

In the case of this embodiment, the wavelength conversion wheel 31 makes the excitation light B incident from the rear surface 312a and emits the yellow fluorescent light YL obtained by wavelength-converting the excitation light B from the front surface 312b. Further, in the state in which the wavelength conversion unit 30 is attached to the attaching section 80 of the optical unit 40, a part of the wavelength conversion wheel 31 is located on the optical path between the condensing optical system 60 and the pickup optical system 61.

With this configuration, in the transmissive wavelength conversion wheel 31, it is possible to improve flexibility of the layout of the light source device 2.

In the case of this embodiment, the cooling unit 50 includes the heat radiating section 51 disposed in parallel to the optical unit 40 and the heat conducting section 52 that conducts heat received by the base member 23 of the light source unit 20 to the heat radiating section 51.

With this configuration, it is possible to efficiently cool the light emitting element 21 of the light source unit 20.

In the case of this embodiment, the wavelength conversion unit 30 is disposed between the heat radiating section 51 and the optical unit 40. Therefore, a space can be secured on the opposite side of the wavelength conversion unit 30 (the right side +X) with respect to the optical unit 40. Accordingly, for example, it is possible to reduce the size of a device configuration of the projector 1 by disposing the projector components in the space on the right side +X of the optical unit 40.

The projector 1 in this embodiment includes the light source device 2 with improved flexibility of the layout. Therefore, it is possible to provide a projector having high flexibility of the layout of an internal configuration. Accordingly, a projector having a high added value for facilitating a layout change corresponding to specifications is provided.

The projector 1 in this embodiment includes the light source device 2, the image forming device 3 that forms light output from the light source device 2 into image light, and the projection optical device 6 that projects the image light output from the image forming device 3.

The projector 1 in this embodiment includes the light source device 2 with improved flexibility of the layout. Therefore, it is possible to provide a projector having high flexibility of the layout of an internal configuration. Accordingly, a projector having a high added value for facilitating a layout change corresponding to specifications is provided.

According to this embodiment, since the projector 1 includes the light source device 2 that prevents intrusion of dust, it is possible to provide a projector having high reliability by preventing an operation failure of the light source device 2 due to dust. Since a dust collecting filter for preventing intrusion of dust into the light source device 2 can be omitted, the device configuration of the projector 1 can be simplified.

According to this embodiment, the projector 1 includes the light source device 2 that generates the bright illumination light WL while being reduced in the size of the device configuration. Therefore, it is possible to provide a projector that is small in size and displays a bright image.

Second Embodiment

Subsequently, a light source device in a second embodiment is explained.

The light source device in this embodiment is different from the light source device in the first embodiment in an attaching direction of the wavelength conversion unit 30 to the optical unit 40. Components and members common to the first embodiment are denoted by the same reference numerals and signs and explanation is omitted about details of the components and the members.

Figure 11:
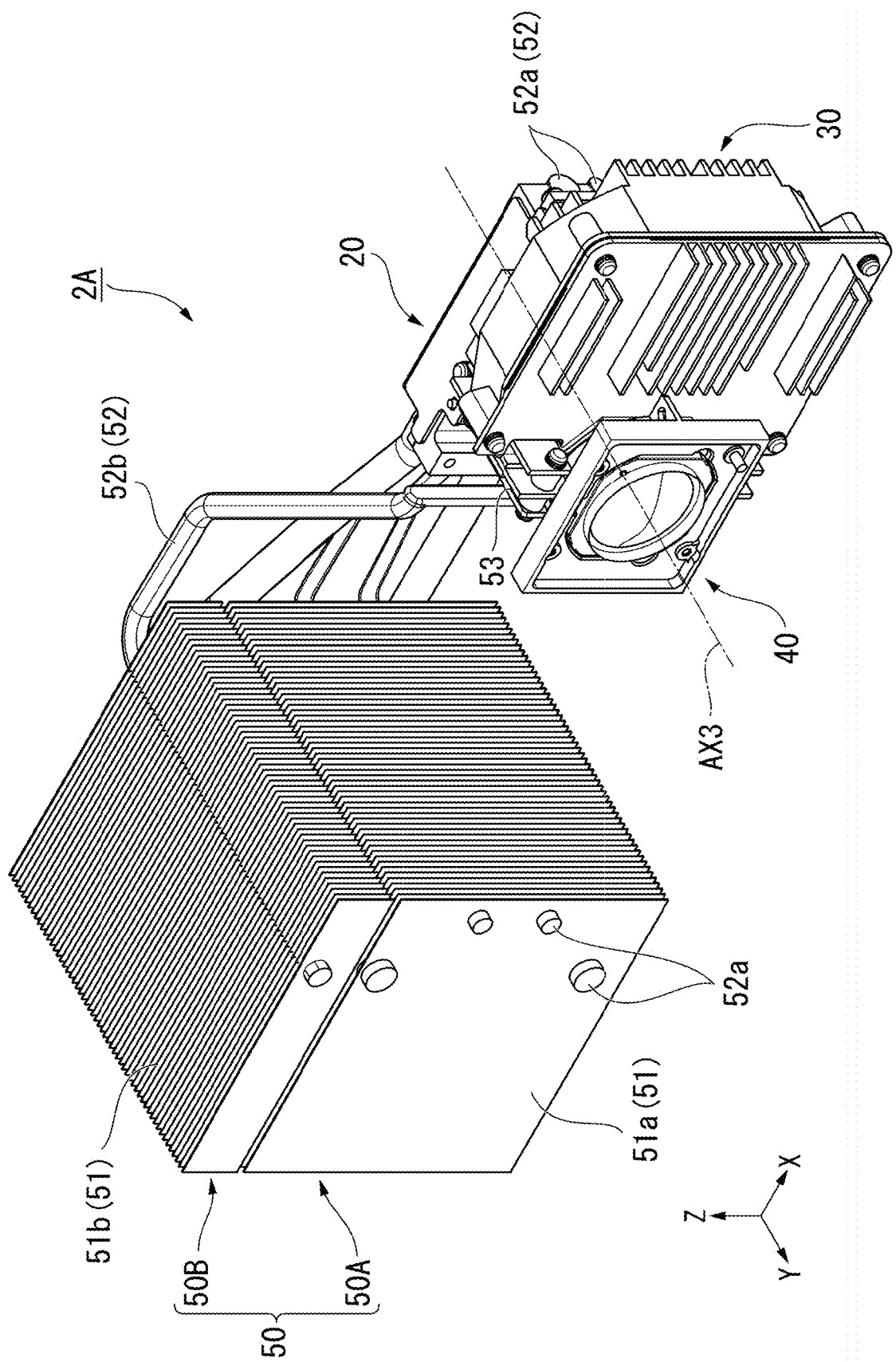
FIG. 11 is a perspective view showing a schematic configuration of a light source device in a second embodiment.

FIG. 11 is a perspective view showing a schematic configuration of a light source device 2A in this embodiment.

As shown in FIG. 11, in the light source device 2A in this embodiment, when viewed from a position on the +Y side, the wavelength conversion unit 30 is attached to the right side +X of the optical unit 40.

In this embodiment, when the wavelength conversion unit 30 is attached to the right side +X of the optical housing 62, that is, when the wavelength conversion unit 30 is attached to the opposite side of the cooling unit 50 with respect to the condensing optical system 60, the attaching section 126 of the wavelength conversion unit 30 and the screw fastening sections 82a of the second attachment structure 82 are fixed by the screw members 24. Since the second attachment structure 82 has the same configuration as the configuration of the first attachment structure 81, it is possible to attach the wavelength conversion unit 30 to the second attachment structure 82 by rotating the wavelength conversion unit 30 180° around the optical axis AX3.

In this embodiment, as shown in FIG. 3, the wavelength conversion unit 30 and the prism member 63 are respectively disposed on the right side +X, which is one side in the left-right direction X crossing the optical axis AX3 of the first lens 60a of the condensing optical system 60, with respect to the optical housing 62. That is, the wavelength conversion unit 30 and the prism member 63 are located on the same right side +X with respect to the optical axis AX3. A part of the wavelength conversion unit 30 overlaps the prism member 63 in the front-rear direction Y extending along the optical axis AX3.

In the case of this embodiment, the wavelength conversion unit 30 is attached to the optical housing 62 using the second attachment structure 82. Therefore, the first attachment structure 81 is not used to attach the wavelength conversion unit 30.

In the light source device 2A in this embodiment, when viewed from a position on the +Y side, the lid body 53 thermally connected to the second heat conducting section 52b of the second cooling section 50B is attached to the left side −X of the optical unit 40 using the first attachment structure 81.

In this embodiment, when the lid body 53 is attached to the left side −X of the optical housing 62, the attaching section 53b of the lid body 53 and the screw fastening sections 81a of the first attachment structure 81 are fixed by the screw members 24.

In this way, in the light source device 2A in this embodiment, when viewed from a position on the +Y side, the wavelength conversion unit 30 is disposed on the right side +X in the left-right direction X in which the external shape of the optical housing 62 further projects with respect to the optical axis AX3.

With the light source device 2A in this embodiment, when the wavelength conversion unit 30 is attached to the optical housing 62, the width of the wavelength conversion unit 30 projecting in the left-right direction X from the end face of the light-source fixing section 70 of the optical housing 62 can be reduced to be smaller than the width in the configuration of the light source device 2 in the first embodiment. Therefore, with the light source device 2A in this embodiment, it is possible to achieve a reduction in the size of a device configuration of the light source device 2A by further reducing the size in the left-right direction X.

In this embodiment, the wavelength conversion unit 30 is disposed on the right side +X, which is the opposite side of the heat radiating section 51 with respect to the optical unit 40. In this case, compared with a configuration in which the wavelength conversion unit 30 is disposed on the same side as the heat radiating section 51 with respect to the optical unit 40 as in the first embodiment, a space is formed between the light source unit 20 and the heat radiating section 51. Therefore, it is desirable to effectively use this excess space.

Figure 12:
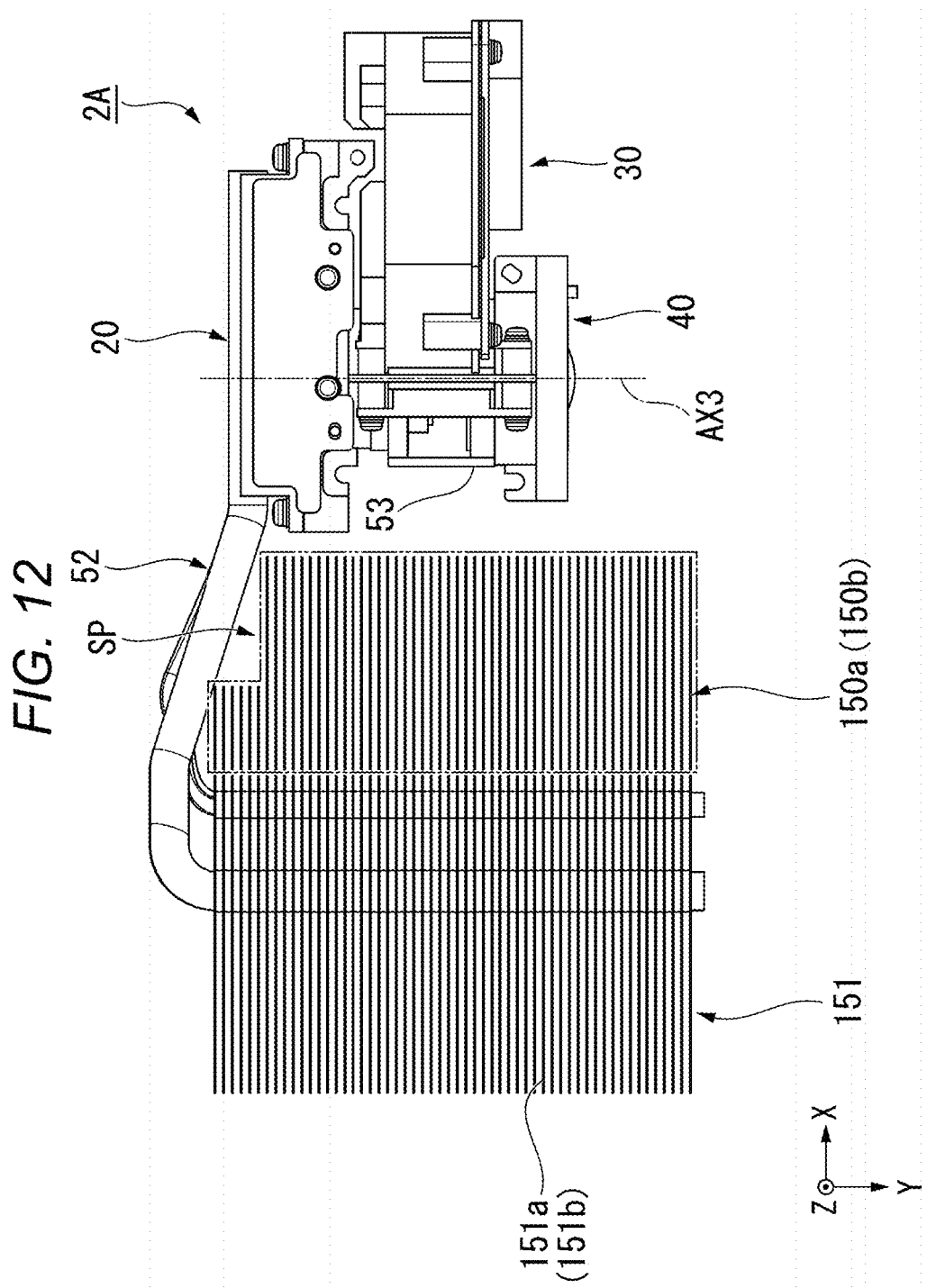
FIG. 12 is a plan view showing the configuration of a light source device in a modification of the second embodiment.

FIG. 12 is a plan view showing the configuration of a light source device in a modification in which the excess space is effectively used. In FIG. 12, illustration of a heat conducting section connected to the lid body 53 is omitted in order to clearly show the figure.

As shown in FIG. 12, a first heat radiating section 151a and a second heat radiating section 151b in a heat radiating section 151 respectively include extending portions 150a and 150b extending to a portion overlapping the excess space SP. With the heat radiating section 151, it is possible to improve heat radiation performance by enlarging the area of the heat radiating section 151 and prevent an increase in the size of the device configuration of the light source device by using the excess space SP.

Third Embodiment

Subsequently, a light source device in a third embodiment is explained.

The light source device in this embodiment is different from the light source devices in the first embodiment and the second embodiment in the configuration of an optical unit. Components and members common to the embodiments explained above are denoted by the same reference numerals and signs and explanation is omitted about details of the components and the members.

Figure 13:
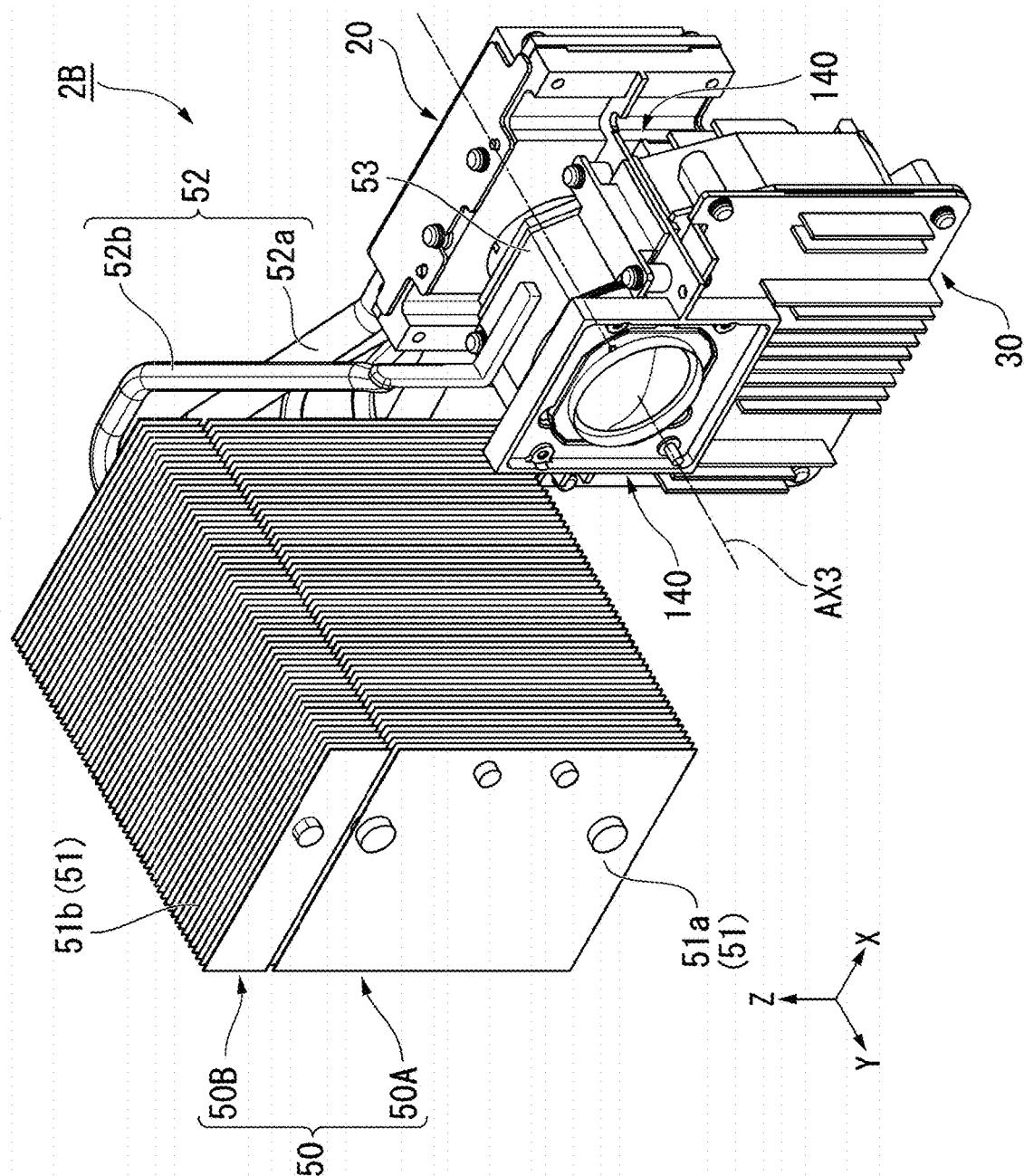
FIG. 13 is a perspective view showing a schematic configuration of a light source device in a third embodiment.

FIG. 13 is a perspective view showing a schematic configuration of a light source device 2B in this embodiment.

As shown in FIG. 13, the light source device 2B in this embodiment includes the light source unit 20, an optical unit 140, the wavelength conversion unit 30, and the cooling unit 50.

Figure 14:
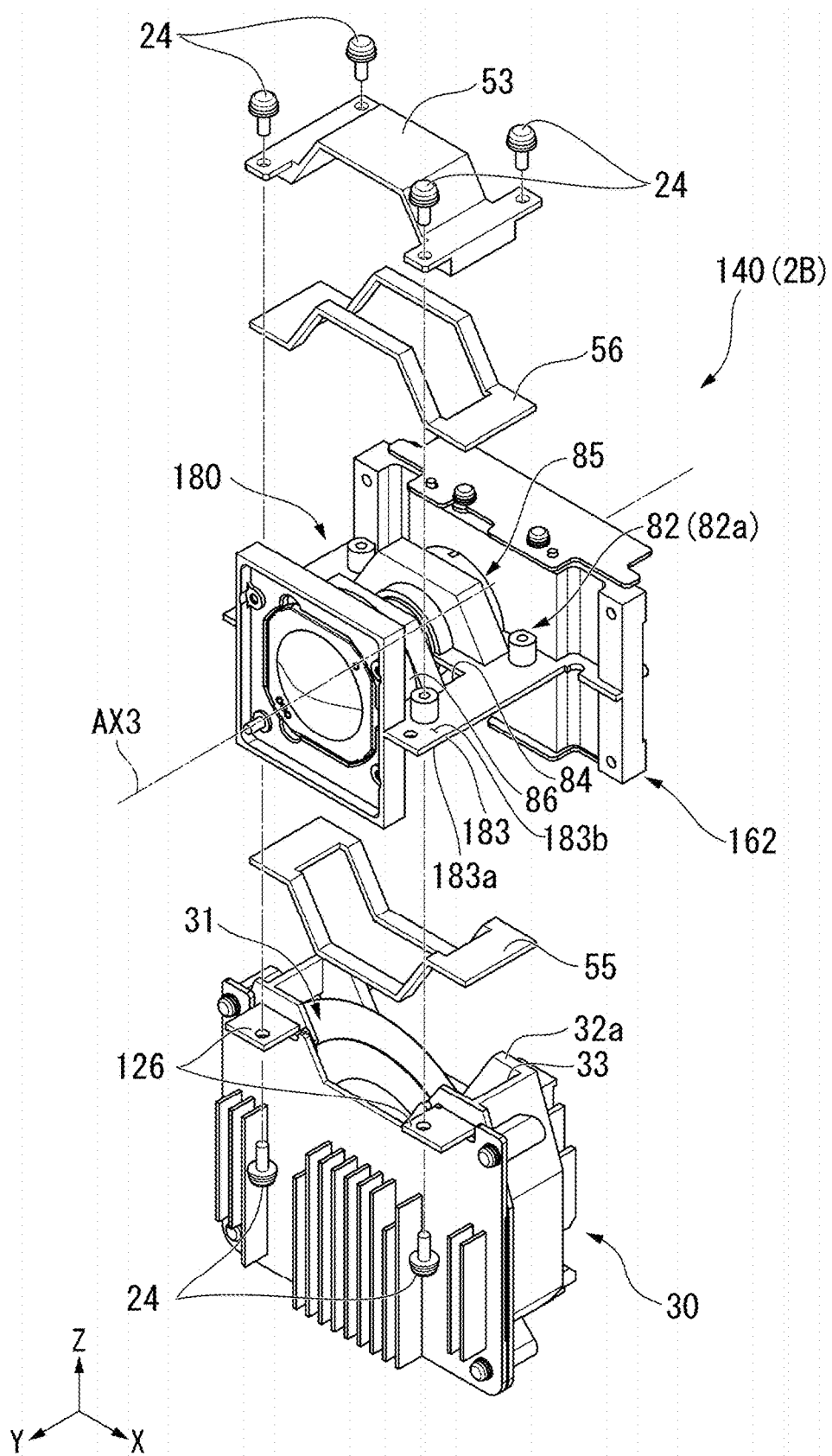
FIG. 14 is an exploded perspective view showing the configuration of the light source device in the third embodiment.

FIG. 14 is an exploded perspective view showing the configuration of the light source device 2B.

As shown in FIG. 14, the optical unit 140 in the light source device 2B in this embodiment includes an optical housing 162 different in a shape from the embodiments explained above. The optical housing 162 includes an attaching section 180, the first member 85, and the second member 86.

The optical housing 162 in this embodiment is different from the optical housing 62 in the first and second embodiments in that the attaching section 180 is rotated 90° around the optical axis AX3 of the condensing optical system 60 shown in FIG. 3 with respect to the first member 85 and the second member 86. The configuration other than the layout of the attaching section 180 in the optical housing 162 is generally common to the optical housing 62 in the first and second embodiments. Therefore, explanation is omitted about details of the configuration.

In the case of this embodiment, the wavelength conversion unit 30 can be attached from a plurality of directions, specifically, two directions in the up-down direction Z with respect to the optical axis AX3 by using the attaching section 180 of the optical housing 162. In this embodiment, the wavelength conversion unit 30 is disposed, with respect to the optical unit 140, in the up-down direction Z crossing the left-right direction X in which the optical unit 140 and the heat radiating section 51 are adjacent to each other.

Specifically, in the light source device 2B in this embodiment, when viewed from a position on the +Y side, the wavelength conversion unit 30 is attached to the lower side −Z of the optical unit 140 via the first sealing member 55 by the screw members 24 and the lid body 53 is attached to the upper side +Z of the optical unit 140 via the second sealing member 56 by the screw members 24.

Figure 15A:
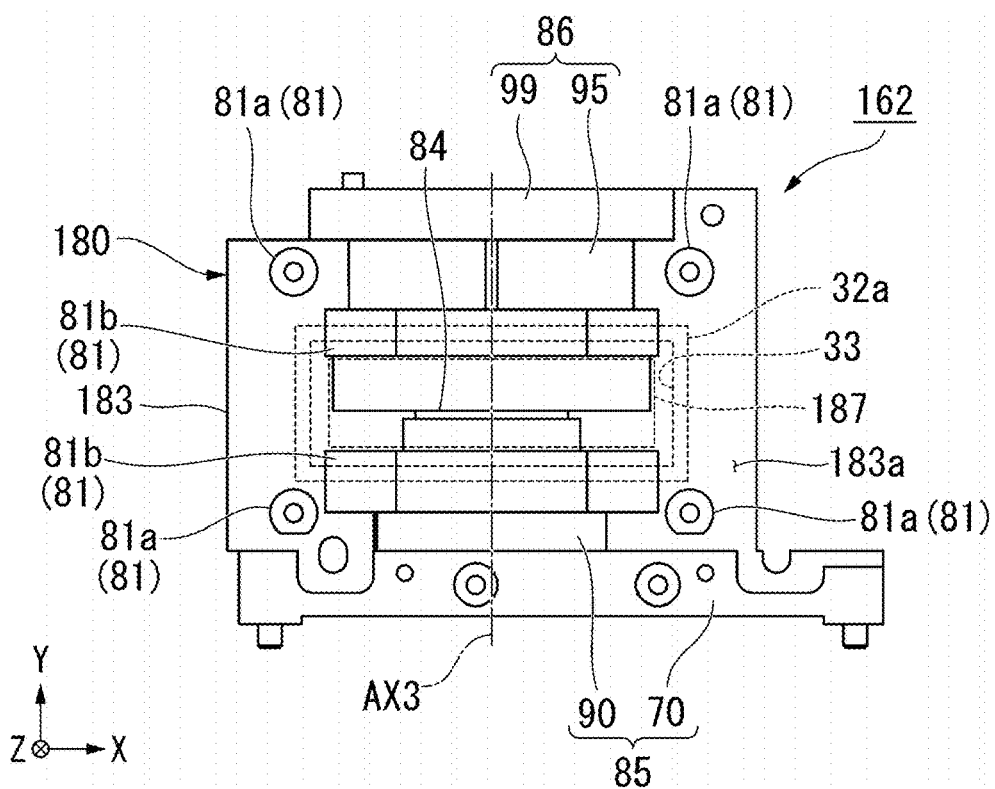
FIG. 15A is a bottom view of an optical housing in the third embodiment viewed from a −Z side.
Figure 15B:
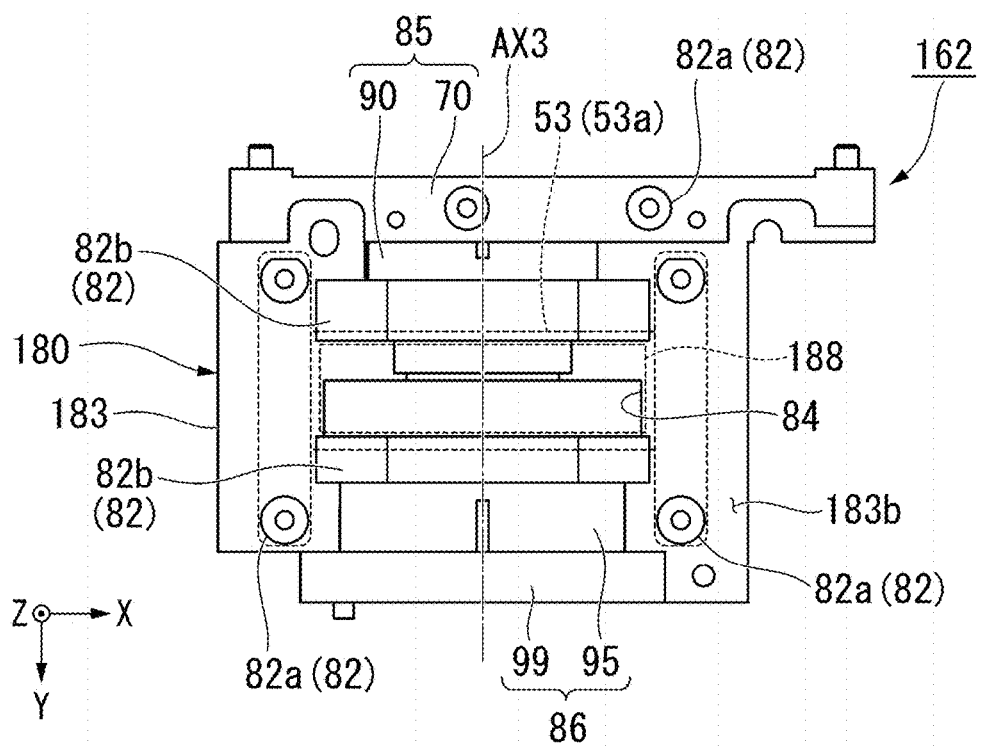
FIG. 15B is a bottom view of the optical housing in the third embodiment viewed from a +Z side.

FIGS. 15A and 15B are side views showing a main part configuration of the optical housing 162. FIG. 15A is a bottom view of the optical housing 162 viewed from the −Z side. FIG. 15B is a top view of the optical housing 162 viewed from the +Z side.

As shown in FIGS. 15A and 15B, in the optical housing 162 in this embodiment, the attaching section 180 includes the first attachment structure 81, the second attachment structure 82, and an attachment plate 183 extending along an XY plane. The attachment plate 183 in this embodiment includes a first attachment surface 183a extending along the optical axis AX3 of the condensing optical system 60 and facing the lower side −Z, a second attachment surface 183b extending along the optical axis AX3 of the condensing optical system 60 and facing the upper side +Z opposite to the first attachment surface 183a, and the through-hole 84. The attachment plate 183 is located on the optical axis AX3 of the condensing optical system 60.

The optical housing 162 enables, with the first attachment structure 81, the wavelength conversion unit 30 to be attached to the lower side −Z.

The optical housing 162 in this embodiment includes a lower side opening section 187, which is a second opening section, provided on the first attachment surface 183a side of the attaching section 180. The lower side opening section 187 is an opening defined by a boundary between a space sandwiched by the pair of pedestals 81b and the outside of the space.

As shown in FIG. 14, when the wavelength conversion unit 30 is attached to the lower side −Z of the optical housing 162, the attaching section 126 of the wavelength conversion unit 30 and the screw fastening sections 81a of the first attachment structure 81 shown in FIG. 15A are fixed by the screw members 24. At this time, as shown in FIG. 15A, in the wheel housing 32, the wheel opening end face 32a of the wheel housing 32 configuring the wheel opening section 33 collides with the pedestals 81b and the attachment plate 183 of the first attachment structure 81 such that the wheel opening section 33 planarly surrounds the lower side opening section 187.

In this embodiment as well, the wavelength conversion element 312, which is a part of the wavelength conversion wheel 31 exposed via the wheel opening section 33 of the wheel housing 32, is disposed on the optical path between the condensing optical system 60 and the pickup optical system 61 via the lower side opening section 187 of the optical housing 162 in a state in which the wavelength conversion unit 30 is attached to the attaching section 180 of the optical housing 162 of the optical unit 40.

As shown in FIG. 14, in the optical unit 40 and the wavelength conversion unit 30, the lower side opening section 187 of the optical housing 162 and the wheel opening section 33 of the wheel housing 32 are fixed in a sealed state by the first sealing member 55.

In the optical housing 162, the wavelength conversion unit 30 can be attached to the upper side +Z as well by the second attachment structure 82. However, as explained above, the wavelength conversion unit 30 is attached to the lower side −Z of the optical housing 162 using the first attachment structure 81. Accordingly, in this embodiment, the second attachment structure 82 is not used to attach the wavelength conversion unit 30.

The optical housing 162 in this embodiment includes an upper side opening section 188, which is a third opening section, provided on the second attachment surface 183b side of the attaching section 180. The upper side opening section 188 is an opening defined by a boundary between a space sandwiched by the pair of pedestals 82b and the outside of the space. The upper side opening section 188 is opposed to the lower side opening section 187 across the attachment plate 183 of the attaching section 180.

As shown in FIG. 14, when the lid body 53 is attached to the optical housing 162, the attaching section 53b of the lid body 53 and the screw fastening sections 82a of the second attachment structure 82 are fixed by the screw members 24. At this time, as shown in FIG. 15B, in the lid body 53, the lid main body section 53a collides with the pedestals 82b and the attachment plate 83 of the second attachment structure 82 to close the upper side opening section 188.

In the optical unit 40 and the lid body 53, the upper side opening section 188 of the optical housing 162 and the lid body 53 are fixed in a sealed state by the second sealing member 56.

In this way, with the light source device 2B in this embodiment, it is possible to provide a light source device having a sealed structure that enables the wavelength conversion unit 30 to be attached to the optical unit 140 from the two directions in the up-down direction Z.

The embodiment of the present disclosure is explained above as an example. However, the present disclosure is not always limited to the embodiment. Various changes can be applied without departing from the gist of the present disclosure.

For example, in the first embodiment, as an example, the first member 85 and the second member 86 are integrally formed in the optical housing 62. However, the first member 85 and the second member 86 may be formed by separate bodies. For example, the optical housing 62 may be configured by coupling, with the attachment plate 83, the first member 85 and the second member 86 formed by the separate bodies. With this configuration, since the first member 85 and the second member 86 are configured by separate members, it is easy to incorporate the condensing optical system 60 and the pickup optical system 61 in the first member 85 and the second member 86.

In the embodiment, as an example, the wheel opening section 33 of the wheel housing 32 is configured by the first housing 321 and the second housing 322. However, the wheel opening section 33 may be configured by only one of the first housing 321 and the second housing 322.

In the embodiment, as an example, the attachment section 80 of the optical housing 62 is located on the optical axis AX3 of the condensing optical system 60. However, the attachment plate 83 may be disposed to deviate in any one direction in the left-right direction X with respect to the optical axis AX3.

In each of the optical housings 62 and 162 in the embodiments explained above, the two opening sections are provided to enable the wavelength conversion unit 30 to be attached from the two directions. The opening section to which the wavelength conversion unit 30 is not attached is covered by the lid body 53. However, only one opening section to which the wavelength conversion unit 30 is attached may be provided.

In the light source device 2 in the first embodiment, when viewed from a position on the +Y side, the wavelength conversion unit 30 is disposed on the left side −X in the left-right direction X in which a projection amount of the external shape of the optical housing 62 is small with respect to the optical axis AX3. Therefore, when the wavelength conversion unit 30 is attached to the optical housing 62, overlap in the left-right direction X of the second housing 322 of the wheel housing 32 of the wavelength conversion unit 30 and the optical housing 62 decreases.

That is, compared with when the wavelength conversion unit 30 is attached to the right side +X of the optical housing 62, the surface area of the second housing 322 exposed from the optical housing 62 increases. Therefore, if the wavelength conversion unit is not used in common in the embodiments, about the wavelength conversion unit 30 attached to the left side −X of the optical housing 62 as in the first embodiment, the heat dissipation of the wheel housing 32 may be further improved by increasing the size of the heat radiation fins 130 provided on the surface of the second housing 322 exposed from the optical housing 62.

A light source device according to an aspect of the present disclosure may include the following configuration.

The light source device according to the aspect of the present disclosure includes: a light source unit including: a first mounting substrate on which a first light emitting element is mounted; a second mounting substrate that is disposed in parallel to the first mounting substrate and on which a second light emitting element is mounted; and a base member on which the first mounting substrate and the second mounting substrate are placed; a wavelength conversion unit including: a wavelength conversion wheel configured to emit, from a second surface opposite to a first surface, wavelength-converted light obtained by wavelength-converting light emitted from the first light emitting element and the second light emitting element and made incident from the first surface; and a wheel housing configured to house the wavelength conversion wheel; and an optical unit including: a condensing optical system configured to condense the light emitted from the first light emitting element and the second light emitting element on the wavelength conversion wheel; a pickup optical system configured to pick up the wavelength-converted light; and an optical housing configured to hold the condensing optical system and the pickup optical system to locate the wavelength conversion wheel on an optical path between the condensing optical system and the pickup optical system. The condensing optical system includes: a first lens on which the light emitted from the first light emitting element is directly made incident; and an optical-path changing member including a first reflection surface and a second reflection surface and configured to reflect, with the first reflection surface, the light emitted from the second light emitting element in a direction in which the light is brought closer to the light emitted from the first light emitting element and reflect, with the second reflection surface, the light reflected by the first reflection surface and make the light incident on the first lens. The optical housing includes: a first supporting section formed to recess to the wavelength conversion wheel side with respect to a holding surface for holding the light source unit and configured to support the optical-path changing member; and a second supporting section formed to recess to the wavelength conversion wheel side with respect to a bottom surface of the first supporting section and configured to support the first lens. The holding surface of the optical housing and the base member are fixed.

In the light source device according to the aspect of the present disclosure, the second reflection surface of the optical-path changing member may be located between the first lens and the first mounting substrate in a direction extending along an optical axis of the first lens.

In the light source device according to the aspect of the present disclosure, the base member may include a recess, and the first mounting substrate and the second mounting substrate may be set in the recess.

In the light source device according to the aspect of the present disclosure, the condensing optical system and the pickup optical system may be respectively configured by pluralities of lenses, in the condensing optical system, a diameter of a second lens located closer to the wavelength conversion wheel side than the first lens may be smaller than a diameter of the first lens, in the pickup optical system, a diameter of a third lens located on the wavelength conversion wheel side may be smaller than a diameter of a fourth lens located closer to a light emission side than the third lens, the optical housing may include a diameter-reduced section having a smaller outer diameter than other portions in a position corresponding to the second lens of the condensing optical system and the third lens of the pickup optical system, and the wavelength conversion unit may be disposed in the diameter-reduced section.

In the light source device according to the aspect of the present disclosure, the wavelength conversion unit may be disposed, in a first direction crossing an optical axis of the first lens, on one side in the first direction with respect to the optical housing, and the optical-path changing member may be disposed on another side in the first direction with respect to the optical axis in the optical housing.

In the light source device according to the aspect of the present disclosure, the wavelength conversion unit and the optical-path changing member may be respectively disposed on one side in a first direction crossing an optical axis of the first lens with respect to the optical housing, and a part of the wavelength conversion unit may overlap the optical-path changing member in a second direction extending along the optical axis.

In the light source device according to the aspect of the present disclosure, the wheel housing may include a plurality of heat radiation fins provided in a position not overlapping the optical housing in a direction extending along an optical axis of the first lens on a surface facing the light source unit side.

A projector according to an aspect of the present disclosure may include the following configuration.

The projector according to the aspect of the present disclosure includes: the light source device according to the aspect explained above; an image forming device configured to form light output from the light source device into image light; and a projection optical device configured to project the image light output from the image forming device.

What is claimed is:
1. A light source device comprising:
  a light source unit including:
    a first mounting substrate on which a first light emitting element is mounted;
    a second mounting substrate that is disposed in parallel to the first mounting substrate and on which a second light emitting element is mounted; and
    a base member on which the first mounting substrate and the second mounting substrate are placed;
  a wavelength conversion unit including:
    a wavelength conversion wheel configured to emit, from a second surface opposite to a first surface, wavelength-converted light obtained by wavelength-converting light emitted from the first light emitting element and the second light emitting element and made incident from the first surface; and
    a wheel housing configured to house the wavelength conversion wheel; and an optical unit including:
- a condensing optical system configured to condense the light emitted from the first light emitting element and the second light emitting element on the wavelength conversion wheel;
- a pickup optical system comprising a plurality of lenses configured to receive the wavelength-converted light emitted from the wavelength conversion wheel; and
- an optical housing configured to hold the condensing optical system and the pickup optical system to locate the wavelength conversion wheel on an optical path between the condensing optical system and the pickup optical system, wherein the condensing optical system includes:
- a first lens on which the light emitted from the first light emitting element is directly made incident; and
- an optical-path changing member including a first reflection surface and a second reflection surface and configured to reflect, with the first reflection surface, the light emitted from the second light emitting element in a direction in which the light is brought closer to the light emitted from the first light emitting element and reflect, with the second reflection surface, the light reflected by the first reflection surface and make the light incident on the first lens, the optical housing includes:
- a first supporting section formed to recess to a wavelength conversion wheel side of the optical housing with respect to a holding surface for holding the light source unit and configured to support the optical-path changing member; and
- a second supporting section formed to recess to the wavelength conversion wheel side of the optical housing with respect to a bottom surface of the first supporting section and configured to support the first lens, and the holding surface of the optical housing and the base member are fixed.

2. The light source device according to claim 1, wherein the second reflection surface of the optical-path changing member is located between the first lens and the first mounting substrate in a direction extending along an optical axis of the first lens.

3. The light source device according to claim 1, wherein the base member includes a recess, and
the first mounting substrate and the second mounting substrate are set in the recess.

4. The light source device according to claim 1, wherein the condensing optical system comprises a plurality of lenses,
in the condensing optical system, a diameter of a second lens located closer to a wavelength conversion wheel side of the condensing optical system than the first lens is smaller than a diameter of the first lens,
in the pickup optical system, a diameter of a third lens located on a wavelength conversion wheel side of the pickup optical system is smaller than a diameter of a fourth lens located closer to a light emission side than the third lens,
the optical housing includes a diameter-reduced section having a smaller outer diameter than other portions in a position corresponding to the second lens of the condensing optical system and the third lens of the pickup optical system, and
the wavelength conversion unit is disposed in the diameter-reduced section.

5. The light source device according to claim 1, wherein the wavelength conversion unit is disposed, in a first direction crossing an optical axis of the first lens, on one side in the first direction with respect to the optical housing, and
the optical-path changing member is disposed on another side in the first direction with respect to the optical axis in the optical housing.

6. The light source device according to claim 1, wherein the wavelength conversion unit and the optical-path changing member are respectively disposed on one side in a first direction crossing an optical axis of the first lens with respect to the optical housing, and
a part of the wavelength conversion unit overlaps the optical-path changing member in a second direction extending along the optical axis.

7. The light source device according to claim 1, wherein the wheel housing includes a plurality of heat radiation fins provided in a position not overlapping the optical housing in a direction extending along an optical axis of the first lens on a surface facing a light source unit side of the wheel housing.

8. A projector comprising:
the light source device according to claim 1;
an image forming device comprising at least one light modulation panel configured to generate image light from light output from the light source device; and
at least one projection optical lens configured to project the image light output from the image forming device.

* * * * *